US012249232B2

(12) United States Patent
Rintz et al.

(10) Patent No.: US 12,249,232 B2
(45) **Date of Patent: *Mar. 11, 2025**

(54) INSTANT ALERT NOTIFIER AND DOCKING STATION

(71) Applicant: IP VIDEO CORPORATION, Bay Shore, NY (US)

(72) Inventors: William J Rintz, Hackettstown, NJ (US); Terri-Ann K Adrian, Westport, CT (US); Samuel C Felts, Jr., Raleigh, NC (US); Allen W Moore, Cary, NC (US)

(73) Assignee: IPVIDEO CORPORATION, Bay Shore, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,931

(22) Filed: Dec. 4, 2023

(65) Prior Publication Data

US 2024/0177581 A1 May 30, 2024

Related U.S. Application Data

(63) Continuation of application No. 17/567,119, filed on Jan. 1, 2022, now Pat. No. 11,837,077, which is a (Continued)

(51) Int. Cl.

*G08B 5/22* (2006.01)
*G08B 5/00* (2006.01)

(Continued)

(52) U.S. Cl.

CPC ............... *G08B 5/38* (2013.01); *G08B 5/002* (2013.01); *G08B 5/224* (2013.01); *G08B 5/24* (2013.01); *G08B 21/02* (2013.01)

(58) Field of Classification Search

CPC ........ G08B 21/02; G08B 5/002; G08B 5/224; G08B 25/016; G08B 25/10;

(Continued)

(56) References Cited

U.S. PATENT DOCUMENTS 5,289,162 A * 2/1994 McDaniel ............ F25D 29/008 340/521
7,312,712 B1 * 12/2007 Worrall .................. G08B 21/02 379/38

(Continued)

*Primary Examiner* — Quang Pham

(57) ABSTRACT

An instant alert notifier and docking station for preferred use in emergency situations. Preferably, several notifiers and docking station combinations will be located through a building or location. In a preferred use, the user presses a button and pulls the device cover, which causes the instant alert notifier to preferably perform some or all of the following functions (1) snaps a still image of the person removing the notifier, (2) triggers a "code red" alert and/or activates flashing red LEDS on the mounting/docking stations where they are located throughout the building/in all locations and (3) switches from a front to a rear camera operation. Using the notifier, real time, time- and date-stamped video, audio and/or still images can be captured and uploaded to off-site or on premises law enforcement and first responder devices. The pressing of the button or removal of the notifier from the docking station can also cause the system to stream live video, audio and/or images to the first responders/emergency responders from all of the other notifiers in the building still contained within their corresponding docking stations.

11 Claims, 20 Drawing Sheets

Related U.S. Application Data continuation of application No. 17/236,113, filed on Apr. 21, 2021, now Pat. No. 11,217,073, which is a continuation-in-part of application No. 17/149,555, filed on Jan. 14, 2021, now Pat. No. 11,521,472.

(60) Provisional application No. 63/114,942, filed on Nov. 17, 2020, provisional application No. 62/961,494, filed on Jan. 15, 2020.

(51) Int. Cl.

| | |
|---|---|
| ***G08B 5/24*** | (2006.01) |
| ***G08B 5/38*** | (2006.01) |
| ***G08B 21/02*** | (2006.01) |
| ***G09F 9/33*** | (2006.01) |

(58) Field of Classification Search
CPC ........ G08B 13/19617; G08B 13/19619; G08B 13/19621
See application file for complete search history.

(56) References Cited

U.S. PATENT DOCUMENTS

| | | | | |
|---|---|---|---|---|
| 7,511,614 | B2 * | 3/2009 | Stilp | G06K 7/0008 340/541 |
| D709,505 | S * | 7/2014 | Kim | D14/434 |
| 8,805,640 | B2 * | 8/2014 | Nielsen | G06F 3/048 702/130 |
| 8,837,683 | B2 * | 9/2014 | Conroy | G16H 40/67 379/38 |
| 10,089,809 | B1 * | 10/2018 | Daly | G07C 9/00174 |
| D892,801 | S * | 8/2020 | Liu | D14/433 |
| 10,785,417 | B2 * | 9/2020 | Sakashita | H04N 23/69 |
| 10,805,771 | B1 * | 10/2020 | Tu | G01S 19/34 |
| 10,841,776 | B2 * | 11/2020 | Murphy | H04W 4/90 |
| 11,217,073 | B1 * | 1/2022 | Rintz | G08B 21/02 |
| 11,337,061 | B2 * | 5/2022 | Gray | G10L 15/22 |
| 11,837,077 | B1 * | 12/2023 | Rintz | G08B 25/12 |
| 11,978,988 | B1 * | 5/2024 | King | H01R 24/68 |
| 11,990,718 | B1 * | 5/2024 | King | H01R 13/665 |
| 11,996,660 | B1 * | 5/2024 | King | H01R 31/06 |
| 12,003,051 | B1 * | 6/2024 | King | H01R 31/065 |
| 12,013,709 | B1 * | 6/2024 | King | H01R 13/42 |
| 12,027,968 | B2 * | 7/2024 | King | H02B 1/42 |
| 12,057,665 | B1 * | 8/2024 | King | H05B 47/19 |
| 12,066,848 | B1 * | 8/2024 | King | H01R 31/065 |
| 12,069,786 | B1 * | 8/2024 | King | G06F 1/266 |
| 12,081,025 | B2 * | 9/2024 | King | H01R 24/68 |
| 12,176,666 | B2 * | 12/2024 | King | H01R 33/96 |
| 2001/0038336 | A1 * | 11/2001 | Acevedo | G08B 7/06 340/517 |
| 2002/0050807 | A1 * | 5/2002 | Janik | H01R 13/6675 320/137 |
| 2002/0107043 | A1 * | 8/2002 | Adamson | H04M 1/04 455/573 |
| 2005/0017863 | A1 * | 1/2005 | Woods | G08B 7/064 340/539.1 |
| 2005/0017866 | A1 * | 1/2005 | Woods | G08B 21/02 340/574 |
| 2006/0178128 | A1 * | 8/2006 | Eaton | H04W 4/90 455/404.1 |
| 2008/0001734 | A1 * | 1/2008 | Stilp | H04L 12/2803 340/541 |
| 2008/0135321 | A1 * | 6/2008 | Ripple | A61G 5/043 180/282 |
| 2008/0166990 | A1 * | 7/2008 | Toiv | H04M 11/04 455/414.1 |
| 2013/0052979 | A1 * | 2/2013 | Chiang | G06F 21/31 455/404.1 |
| 2015/0248832 | A1 * | 9/2015 | Piccolo, III | G08B 29/145 340/514 |
| 2015/0269824 | A1 * | 9/2015 | Zhang | A61B 5/746 340/539.12 |
| 2015/0305690 | A1 * | 10/2015 | Tan | A61B 5/02055 600/549 |
| 2016/0224064 | A1 * | 8/2016 | Fleisig | G06F 1/266 |
| 2017/0015291 | A1 * | 1/2017 | Kindberg | B60T 11/26 |
| 2017/0172424 | A1 * | 6/2017 | Eggers | A61B 8/488 |
| 2018/0075712 | A1 * | 3/2018 | Field | G10L 25/51 |
| 2018/0103206 | A1 * | 4/2018 | Olson | H04N 23/6812 |
| 2018/0122220 | A1 * | 5/2018 | Billig | G08B 25/10 |
| 2019/0039748 | A1 * | 2/2019 | Bredemeier | B64D 47/02 |
| 2019/0253670 | A1 * | 8/2019 | Chien | F21S 4/28 |
| 2019/0268627 | A1 * | 8/2019 | Drako | H04W 12/06 |
| 2019/0342526 | A1 * | 11/2019 | Drako | H04N 7/181 |
| 2020/0014964 | A1 * | 1/2020 | Drako | H04N 21/4223 |
| 2020/0068375 | A1 * | 2/2020 | Murphy | H04M 3/5116 |
| 2020/0117900 | A1 * | 4/2020 | Deng | H04L 67/52 |
| 2020/0153872 | A1 * | 5/2020 | Drako | H04L 63/30 |
| 2020/0168063 | A1 * | 5/2020 | Chandler | G07C 9/28 |
| 2020/0250941 | A1 * | 8/2020 | Barson | G08B 5/00 |
| 2021/0076206 | A1 * | 3/2021 | Gray | H04M 3/527 |

* cited by examiner

INSTANT ALERT NOTIFIER AND DOCKING STATION

This application is a continuation of U.S. application Ser. No. 17/567,119, filed Jan. 1, 2022, which is a continuation of U.S. application Ser. No. 17/236,113, filed Apr. 21, 2021, now U.S. Pat. No. 11,217,073, which claims the benefit of and priority to U.S. Application Ser. No. 63/114,942, filed Nov. 17, 2020, and is also a continuation-in-part of U.S. application Ser. No. 17/149,555, filed Jan. 14, 2021, now U.S. Pat. No. 11,521,472, which claims the benefit of and priority to U.S. Application Ser. No. 62/961,494, filed Jan. 15, 2020, all of the above-identified applications are incorporated by reference in their entireties, as if set forth herein, and for all purposes.

FIELD OF THE DISCLOSURE

The disclosure relates generally to emergency notification systems and discloses a novel instant alert notifier and docking station which can also be considered an emergency video notifier.

BACKGROUND

One common obstacle to developing a strategy for handling an emergency situation, such as, without limitation, a school shooting, hostage situation, etc., is the often inability for the responders to have real time video and images from within the location of the emergency and/or inability to be able to communicate with innocent persons located within the location. The disclosed novel device and system is directed to enhancing the information provided to first responders prior to their entry into the location of the emergency to allow them to have more current and relevant information when developing their rescue/extraction plan.

SUMMARY OF THE DISCLOSURE

Generally disclosed is a novel instant alert notifier (preferably novel instant video alert notifier) and docking or mounting station (collectively "docking station"), preferably, for use in emergency situations, though such use is not considered limiting. Preferably, several notifiers and docking station combinations will be located through the building or location. In dire Code Red situations when every second counts, the disclosed instant alert notifier is charged and ready for use. In a preferred use, the user pulls the device cover (preferably a clear cover) outward or downward (depending on the embodiment of the docking station, which causes the instant alert notifier to preferably perform some or all of the following functions (1) snaps a still image of the person removing the notifier, (2) triggers a "code red" alert and/or activates flashing red LEDS on the mounting/docking stations where they are located throughout the building/in all locations and then (3) switches from a front to a rear camera operation (preferably with a built-in LED flash/flashlight front and rear). The user is now able to capture, in real time, time- and date-stamped video and/or still images that can be automatically uploaded to off-site or on premises law enforcement and first responder devices, as well as other designated geographically remote location(s) or other locations on the premises who are preferably not in the room of the building where the notifier was removed from its associated docking station. The removal of the notifier from its docking station can also cause the system to stream live video, audio and/or images to the first responders/emergency responders from all of the other notifiers in the building still contained within their corresponding docking stations, which allows the first responder/emergency personnel to have more information concerning current events within the location of the emergency.

Accordingly, in a "code red" situations, all remaining docked devices in the building/vicinity can preferably switch to video streaming mode to allow police and first responders to monitor individual devices still connected in their docking/mount station to surveil events unfolding in other close or nearby locations. Thus, a criminal's movements within the building may be able to be tracked by law enforcement, as one non-limiting example.

The disclosed instant alert notifier can also be outfitted with a push-to-talk feature allowing communication with first responders.

The unique docking station can preferably charge the instant alert notifier device/emergency video notifier either by 12 volts (similar to a car charger) over the existing pair of wires of an old fire switch or by power over Ethernet ("POE") if two pairs of wires are available similar to CAT5 cables. Another charging alternative can include, without limitation, using an AC/DC adapter for charging from a 110/120 Volt AC line source. However, such charging techniques are not considered limiting and other charging technologies can be used and are considered within the scope of the disclosure.

Where Ethernet is available, the WiFi (LAN) can preferably be inactivated until the instant alert notifier/instant video alert notifier (collectively "IVAN") is pulled out (i.e. out of its resting/connection position with respect to the docketing station). Where Ethernet is not available, a dedicated WiFi configuration can be preferably provided in case all of the IVANs associated with the building geographical area, etc. are pulled at the same time due to traffic. Additionally, the IVAN can work with more than one network similar to a command vehicle.

In fire and other crisis situations power is often lost to the building and communications can be lost to the local network, due to fire, sabotage, etc. The IVAN can preferably be programmed to find another WiFi (lan) connection when help arrives. Where the IVAN is provided with full smartphone capabilities in certain non-limiting embodiments, it can call a predetermined phone number in remote applications. The IVAN can have recording capabilities, which preferably record all of the time, and can save at least (typically 60 seconds, though such time period is not considered limiting and other time periods can be chosen and considered within the scope of the disclosure) to determine the cause of activation. The IVAN can also be used as part of the surveillance system.

In one embodiment, the IVAN can be provided with a "fish-eye" type lens due to common placement in hallway applications. In other situations/uses, as well as at the end of a hallway facing the hallway, a normal lens can also be used.

Once the IVAN has been pulled out of the docking station, it can also provide the user with a flashlight, preferably programmed to activate at the detection of darkness (i.e. to reduce power loss). The IVAN can be designed and/or programmed to allow the user to speak to an operator over wifi. The Inventors also incorporate by reference the disclosures in U.S. Pat. No. 10,225,914 (Date of Patent Mar. 5, 2019) and U.S. Pat. No. 9,679,711 (Date of Patent Jun. 13, 2017) both entitled PORTABLE PROGRAMMABLE DISPLAY AND CONTROL MODULE in their entireties as if fully set forth herein.

The IVAN can also be programmed with or design to include artificial intelligence ("AI") capabilities, including, without limitation, AI variants such as machine learning, deep learning and artificial neural networks. The IVAN can also be designed or programed to be used as part of a complete life safety system.

In one non-limiting use scenario for the IVAN and docking station in a school setting, where a teacher or school administrator/personal sees something suspicious occurring they can go over to the nearest IVAN where they can push an emergency button (which takes a still image of them and saves preferably 60 seconds pre-event. The IVAN can be capable of recording a voice message from that person, such as, without limitation "I just saw a guy with a gun by the 1st floor cafeteria. Initiate active shooter protocols!". The message can then be broadcasted to all of docking stations for the school and red LEDS can begin flashing to alert people in the classrooms and offices. The IVAN can then be removed from the docking station and become a mobile recording/push to talk/text device for the user.

Thus, one function for the IVAN can be to allow for "push to talk" capabilities and also to listen to voice communications from other people inside the school and outside with first responder commands. If the individual feels an event is worth documenting (i.e. a picture of the shooter) they can begin recording video to be sent to police and first responders outside the building. In this non-limiting use embodiment, unnecessary video clogging-up the system that has to be analyzed can be reduced. The cameras of the IVANs that remain in their docking stations can be called-up by police outside the building, such as, based on input from individuals inside though such is not considered limiting. As a non-limiting example, if the event is happening on the 2nd floor, the responders can call-up all cameras on that particular floor to determine effective action and evacuation plans.

The IVAN can also be provided with "shot-spotter technology" which can trigger an automatic voice alert, such as, without limitation, "Gun fire detected 1st floor visitor lobby area." "Initiate Active Shooter protocols!"

The IVAN can also be provided with a "mode" switch based on the location where it's installed to customize the features that would best suits the environment (e.g. school, office, government building, standard facilities, etc.).

In one non-limiting use embodiment, whatever floor the alarm is triggered from (in a multi-floor building) can become the dominant video-voice information data broadcast.

Also, where the camera lens of the IVAN is blocked for a certain preconfigured amount of time (e.g. 5 seconds, etc.) the appropriate CPU/PCB of the IVAN can be programmed to automatically trigger the alarm. As non-limiting examples, lens blockage could be from spray paint, tape, a finger or hand, etc. and the IVAN can save the 60 second pre-event footage which should capture the conduct that caused the blockage.

It is also expected that the video, audio and/or images created by the one or more notifiers can be used as evidence in legal proceedings, as well as used for after action/even training purposes.

The notifier can also be provided with a laser feature (i.e. preferably a LED laser, though not limited to LEDs) to allow the notifier to temporarily blind/distract a suspect/criminal, which may allow others to take action with respect to the event.

DETAILED DESCRIPTION

Figure 1:
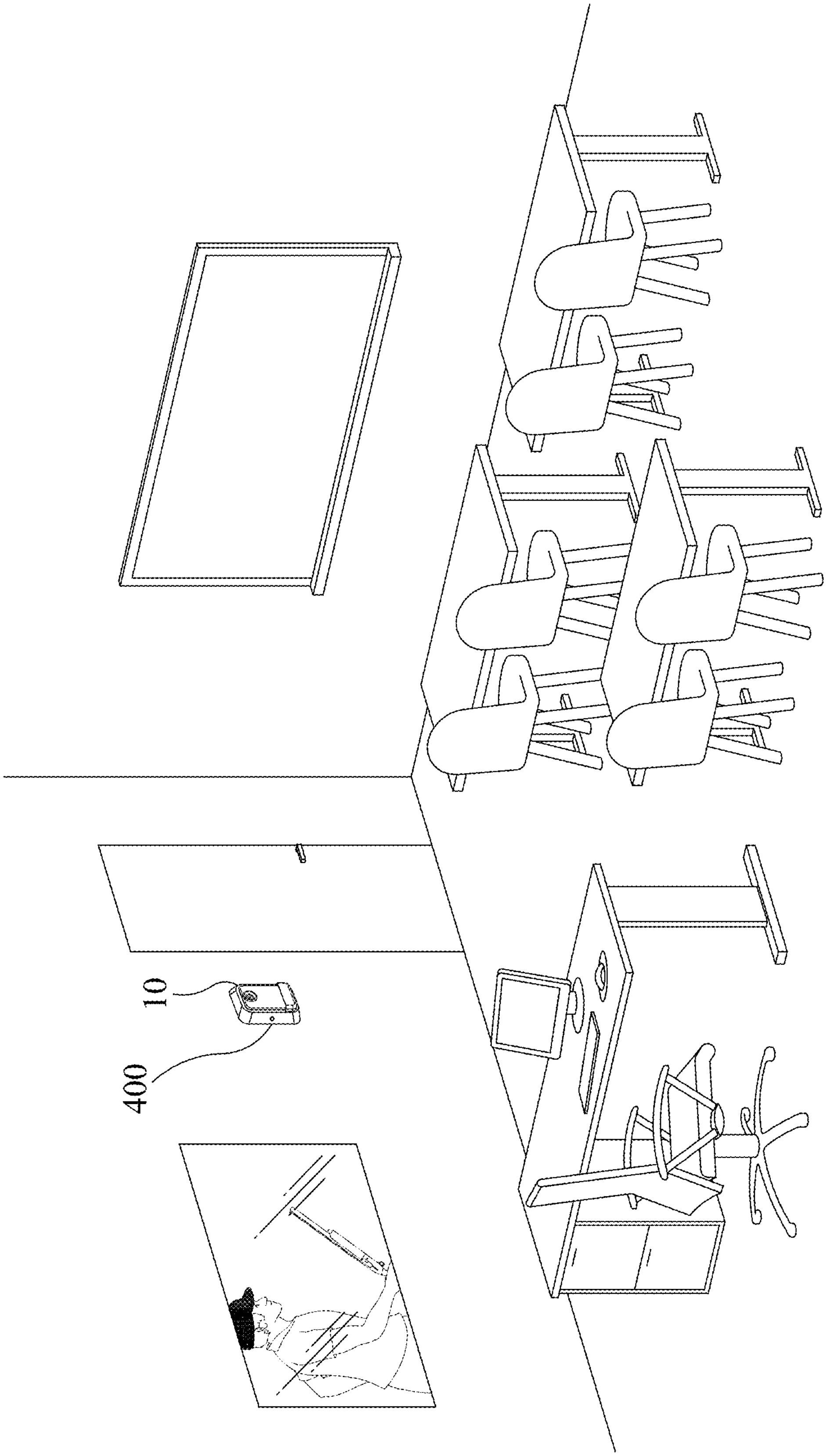
FIG. 1 is a perspective view of one embodiment for the instant alert notifier/emergency video notifier ("IVAN") mounted to a classroom wall through the instant docking station in accordance with the present disclosure.
Figure 2A:
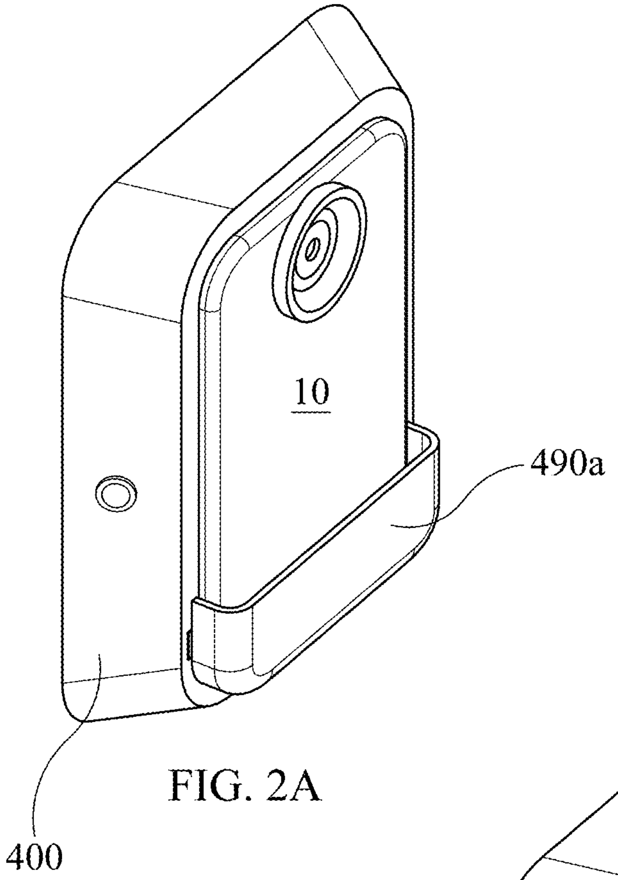
FIGS. 2A and 2B illustrate a non-limiting first step and embodiment for removing the IVAN from its attachment to the docking station.
Figure 2B:
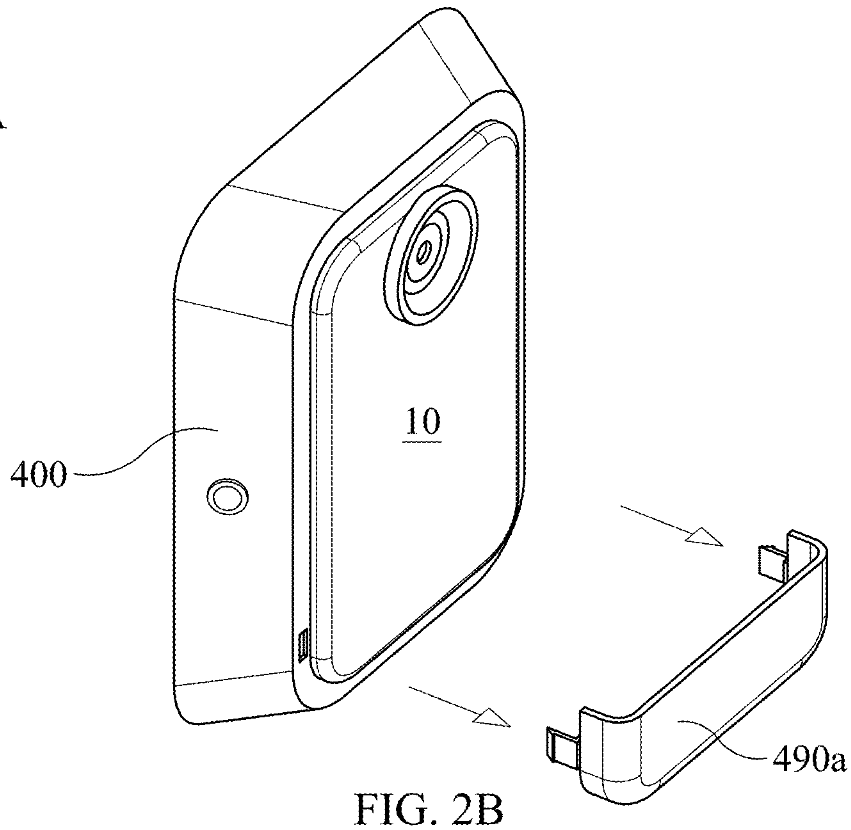
Figure 3A:
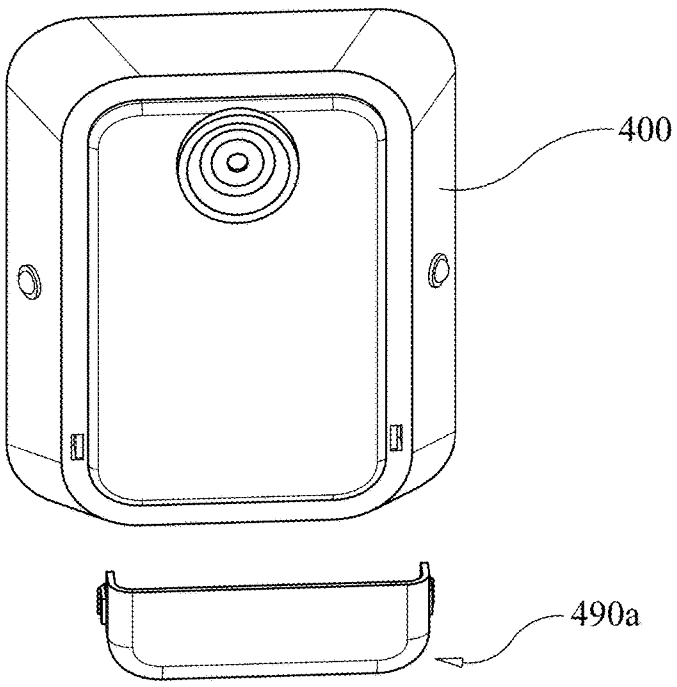
FIGS. 3A and 3B further illustrate the preferred removal first step of FIGS. 2A and 2B and also illustrate a preferred picture taken of the individual involved with the removal first step.
Figure 3B:
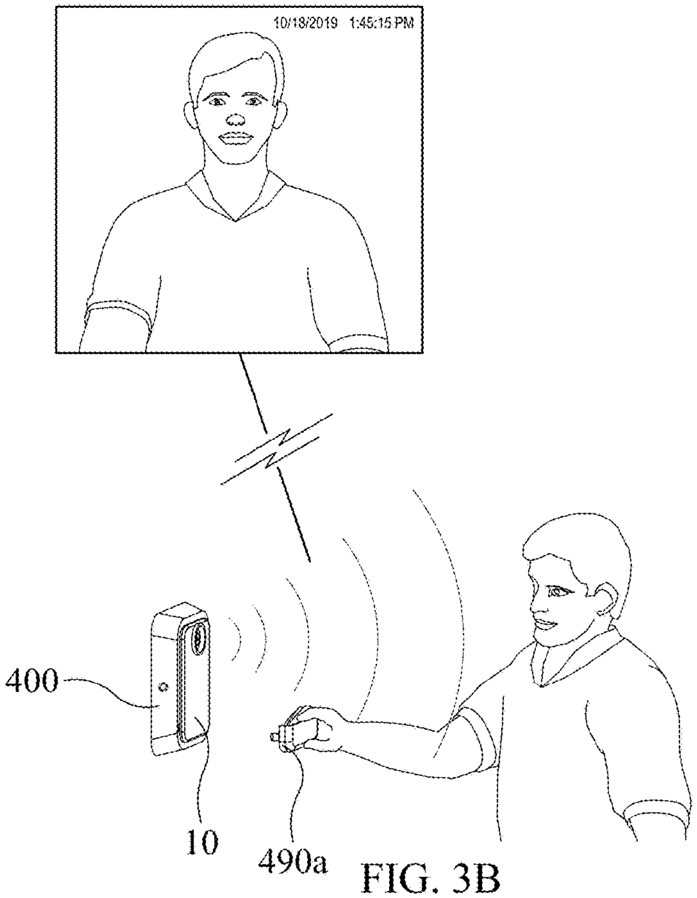
Figure 4:
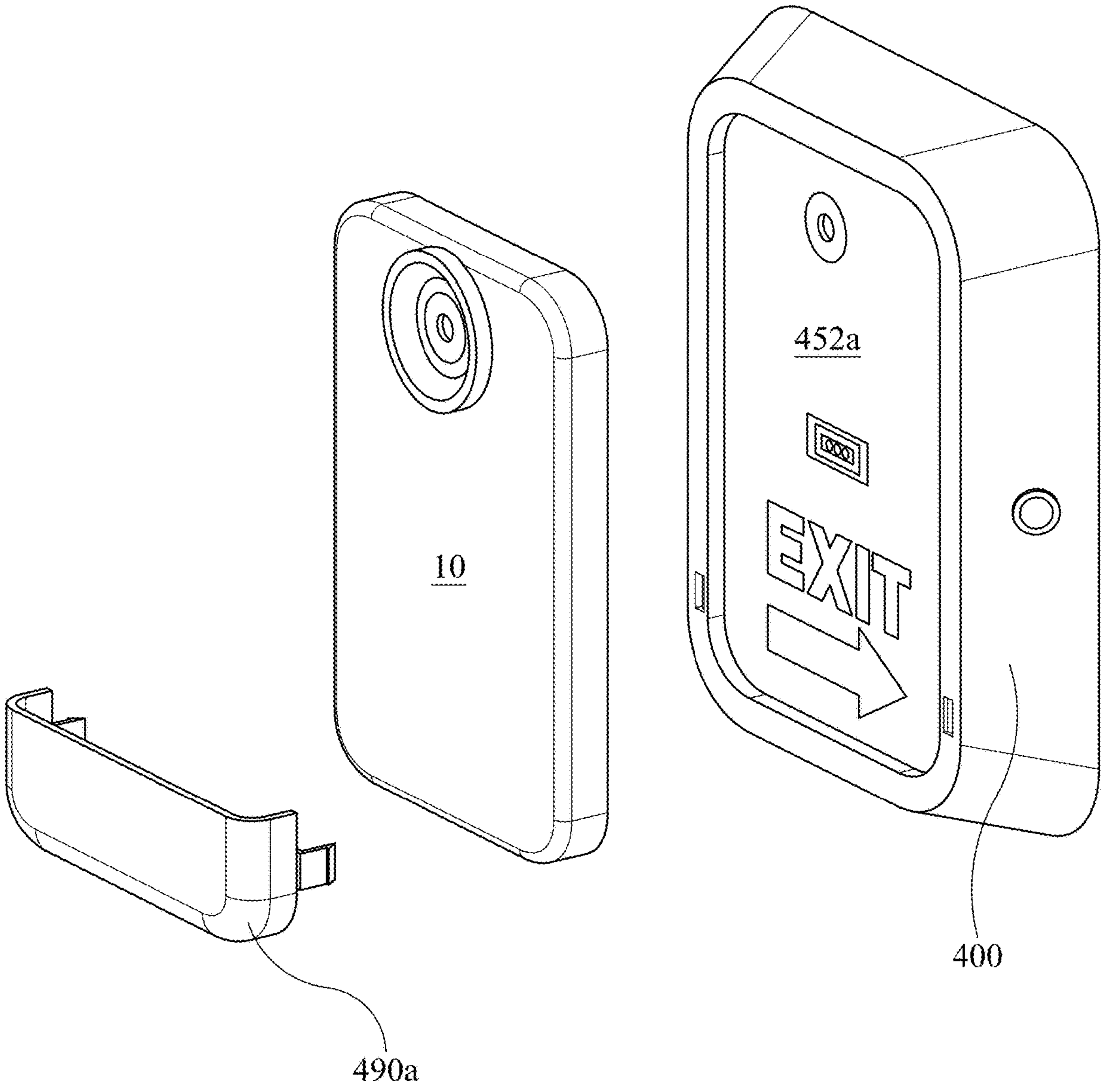
FIG. 4 illustrates the IVAN removed or released from its connection to the docking station.
Figure 5:
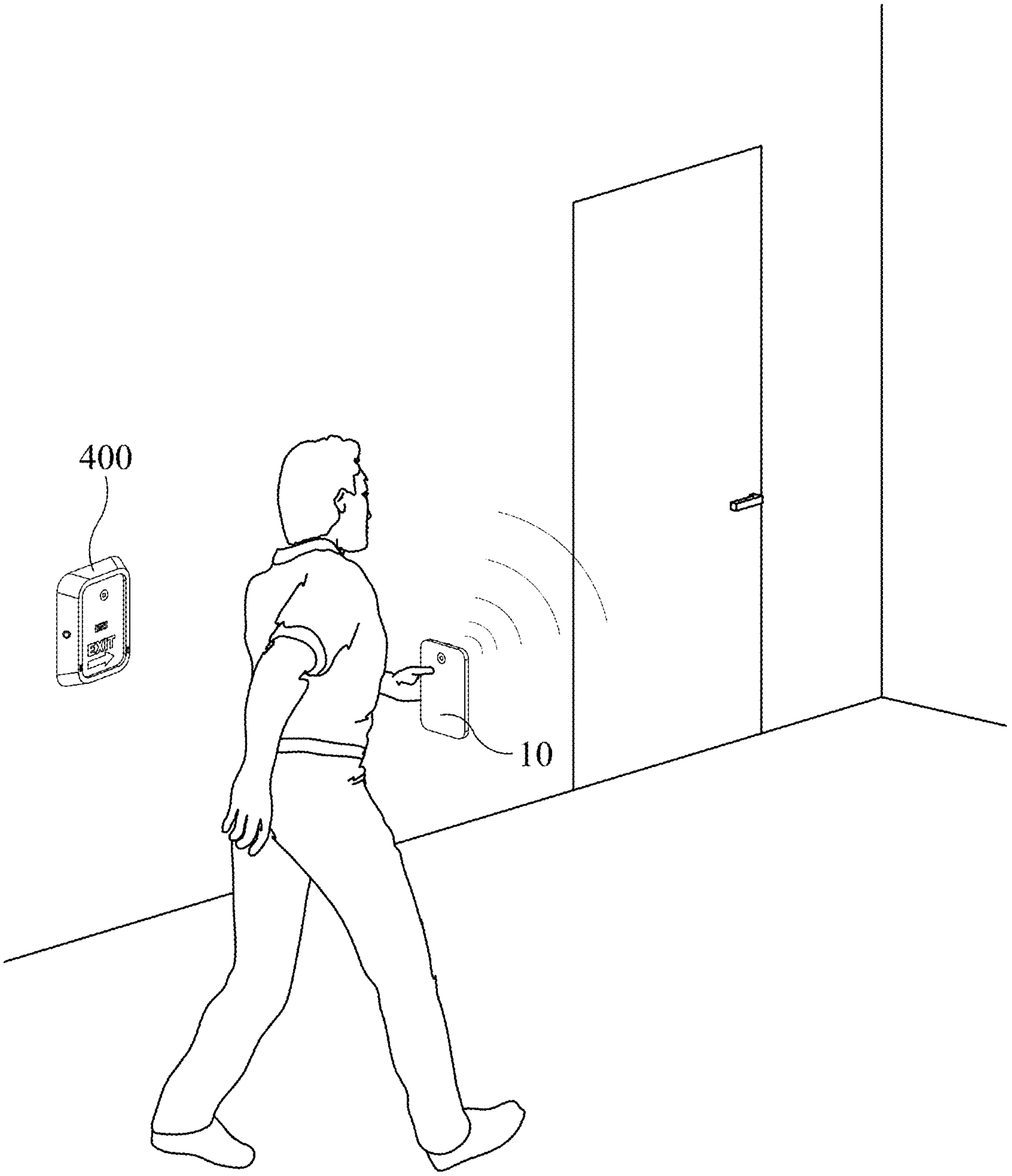
FIG. 5 illustrates the IVAN being handheld by a user during use, such as, but not limited to, during an emergency situation.
Figure 6:
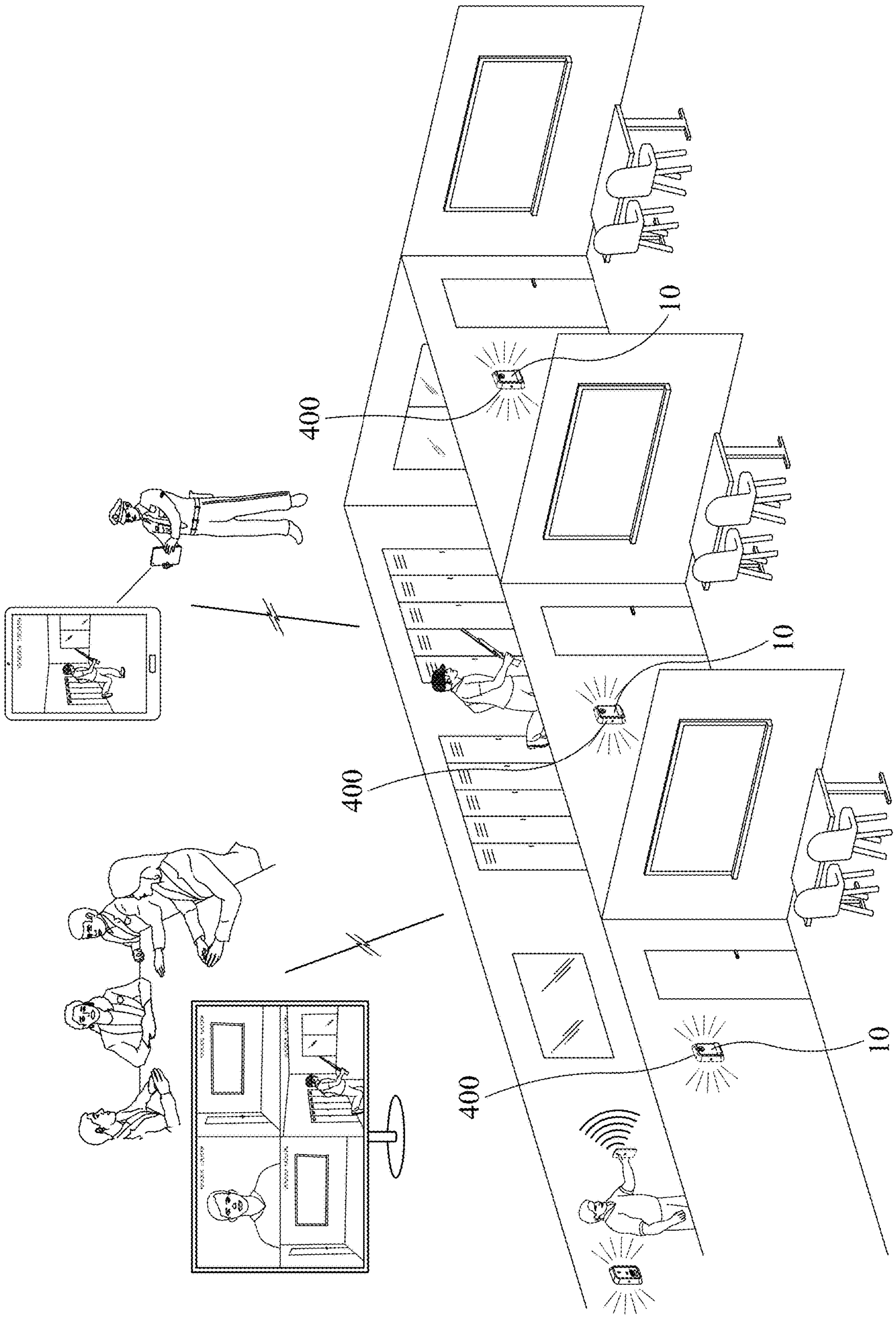
FIG. 6 illustrates the removal of the IVAN preferably triggering actions by other IVANs located in the building or geographical location/area as well as the broadcasting of video and/or images from the removed IVAN to remote locations and/or to emergency responders.
Figure 7:
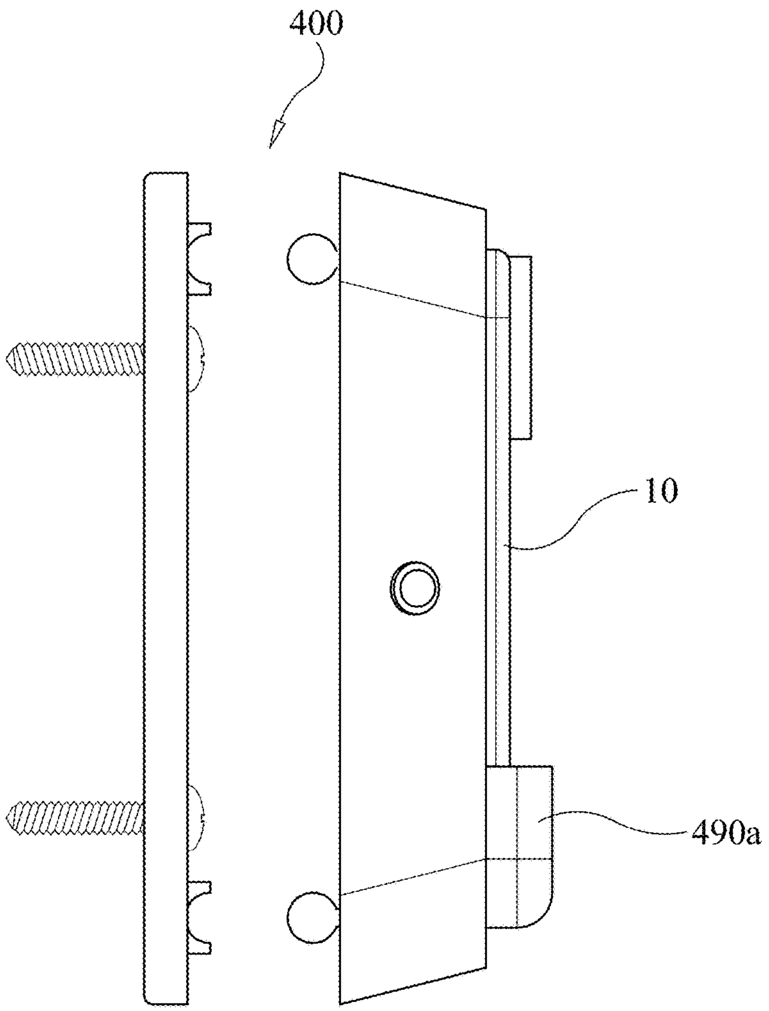
FIG. 7 illustrates a non-limiting embodiment for mounting or securing the docking station to a wall or other surface.
Figure 8:
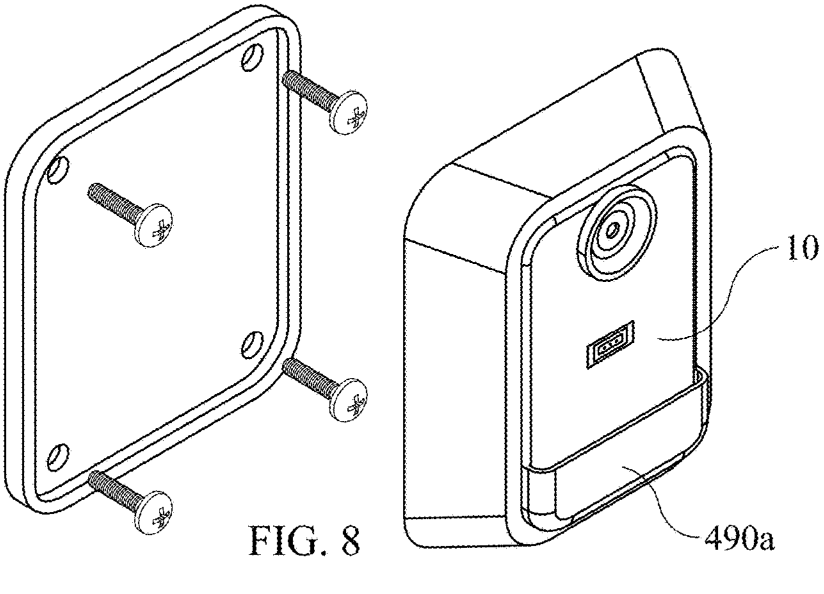
FIG. 8 further illustrates the non-limiting mounting/securing embodiment of FIG. 7.

As seen in the drawings, a virtually instant alert notifier and docket station is shown and generally designated as notifier 10 ("notifier 10") and docking station 400. Docket station 400 can be mounted to a surface, such as, but not limited to a wall surface, and in a preferred embodiment is mounted to an electrical box commonly found for light switches and/or electrical plugs. Preferably, docking station 400 allows the removably attached/secured notifier 10, and as well as preferably docking station 400 itself, to be in electrical communication with the existing electrical circuitry of the building, house, etc., such that notifier 10 can be fully charged when needed.

Notifier 10 preferably connects occupants/persons involved or subjected to an emergency event or other situation to first responders and other designated individuals. Notifier 10 allows for the combination of live video, audio and location monitoring to be provided to the first responders which will allow such responders and other associated or designated individuals to have detailed and current information for their use in planning and/or executing lifesaving rescues.

Though not considered limiting, some preferred uses for notifier 10 include in public schools, government buildings and locations, commercial and retail facilities.

Figure 9A:
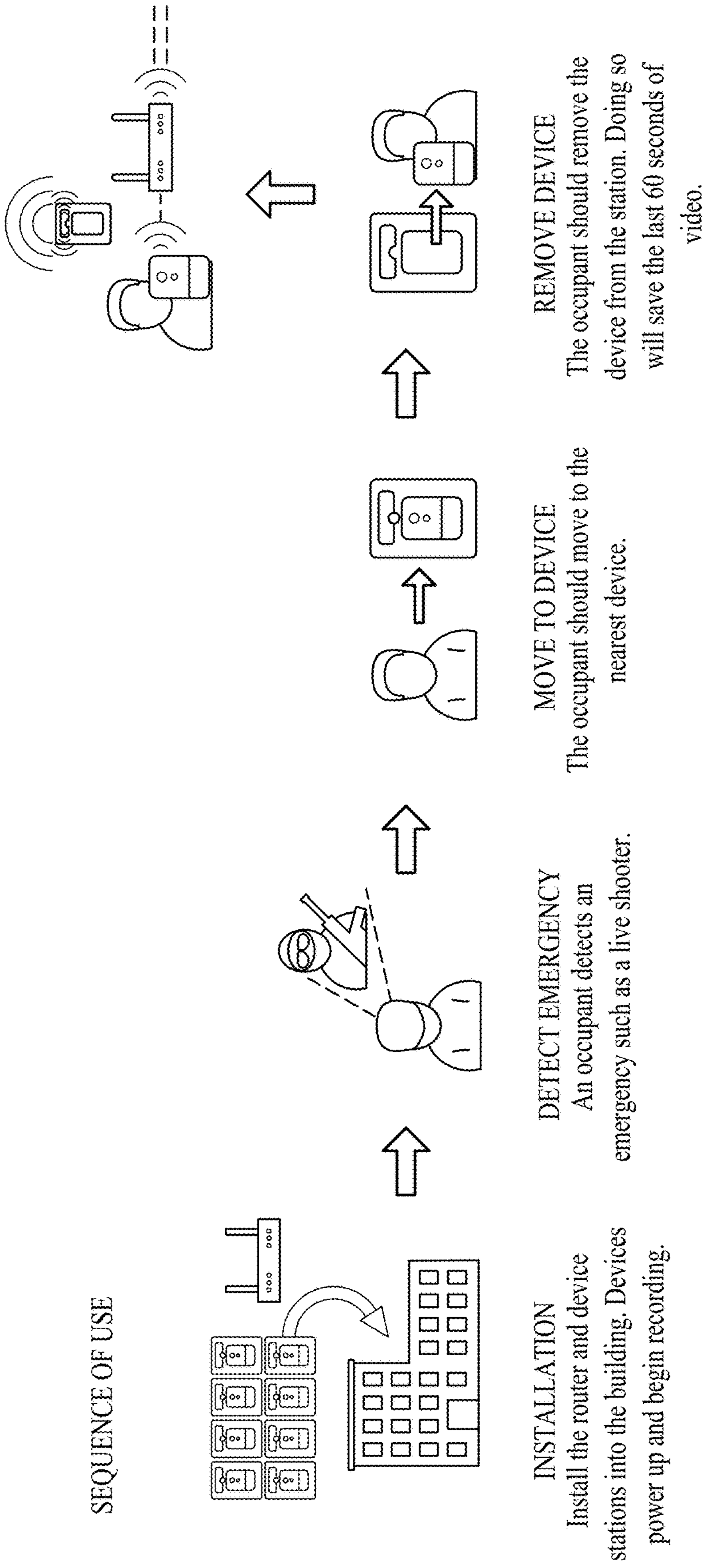
FIGS. 9A and 9B combined show a sequence of preferred use diagram for the novel IVAN in accordance with the present disclosure.
Figure 9B:
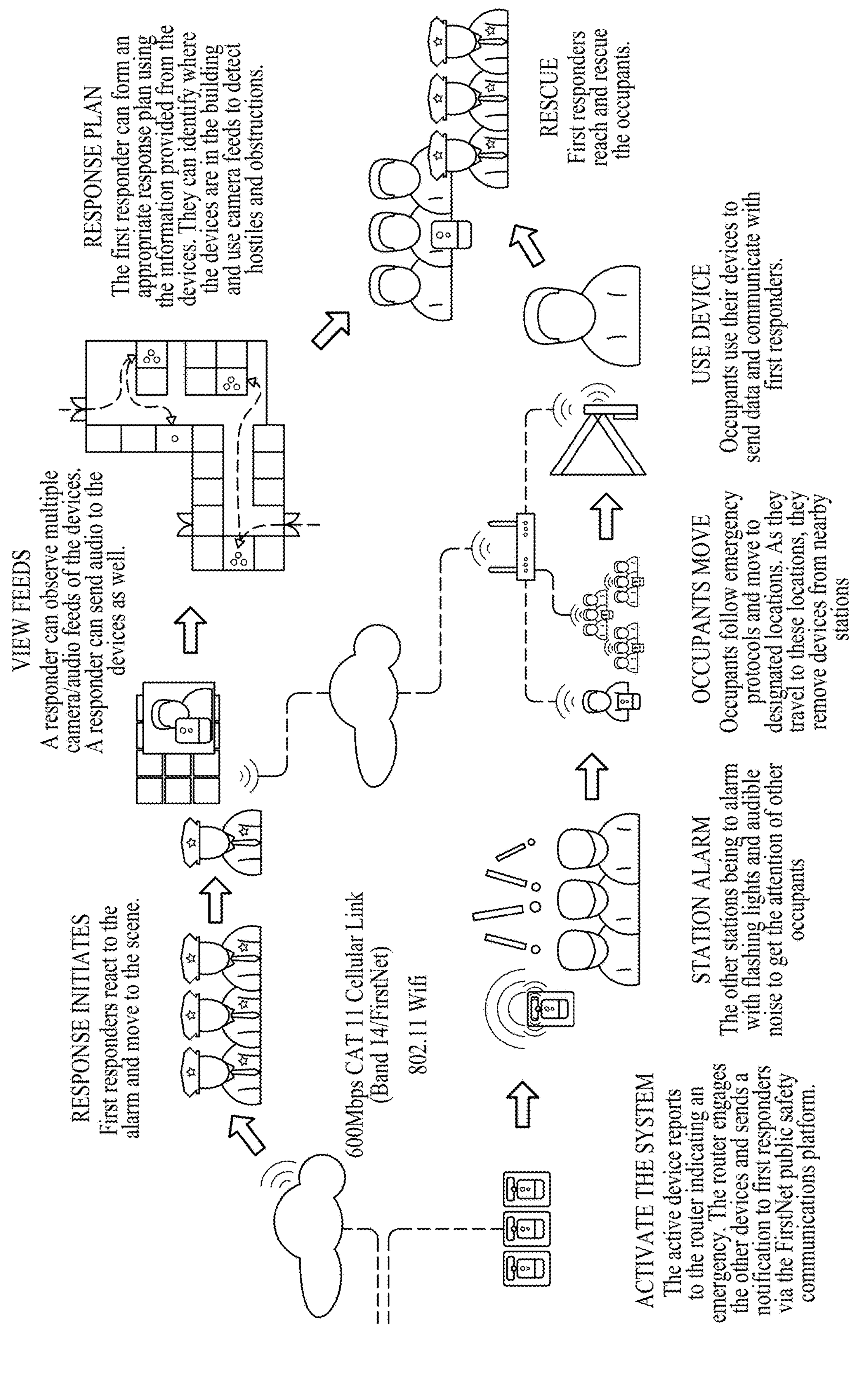

FIG. 9 provides for a preferred non-limiting sequence of use of notifier for an emergency situation. As seen, initially a router and notifier 10 stations are installed in the desired building and once installed notifiers 10 can power up and begin recording. Where an emergency (i.e. live shooter, etc.) is detected by an occupant in the building, the occupant or another individual preferably goes to a notifier 10 station (presumably the closest station to the occupant) and can remove notifier from its mounting/resting/docking point within docking station (such as described below for FIG. 16). Preferably, notifier 10 can be programmed to save the last 60 second (or another programmed time period) of video that was captured by notifier 10. Where the potential user cannot get to notifier 10, one or more key fob can also be strategically placed in the desired building for which the user can wirelessly communicate with the notifier and cause it to activate or otherwise send a signal/information to remote responders/emergency personnel. Notifier 10 can also be programmed allow the user to provide the remote responders/emergency personnel with a more specific message concerning the nature of the emergency, though it is also within the scope of the disclosure just to send out a general emergency signal when activating/removing notifier 10. In one non-limiting embodiment, a few choices can be displayed and provided to the user to select (i.e. shooter, hostage, fire, earthquake, etc.) and upon selection of the one or more appropriate choices for the current emergency such selected information can be digitally/electronically sent/transmitted to the emergency personnel. In addition to remote key fob activation/communication, the system and/or notifier 10 can be programmed to also recognize voice commands from a user.

Once activated by removing from its docketing station 400, notifier 10 can report to the router indicating an emergency or other event. The router preferably engages or otherwise electrically/electronically communicates (preferably through a Wifi communication, though not limiting) with the other notifiers 10 positioned in the building or relevant area of the emergency/event, and can send a notification to appropriate first responders and/or other designated or appropriate individuals, such as, but not limited to, via the FirstNet Authority First Priority public safety communications platform—Band 14 or similar technology or another preferably wireless electronic communication technology—Wifi, cellular, Ethernet etc.). Once receiving notification of the emergency/event, barring some unusual event, the first responders usually will react to the notification and move/travel to the scene of the emergency/event. The other notifiers 10 at the scene of the emergency/event, upon engagement with the router can be preferably programmed to begin to sound an audible noise alarm and/or to begin flashing lights to get the attention (i.e. alert) other occupants at or near the scene of the emergency/event, that there is a situation occurring at or near their geographical location.

Additionally, the other notifiers 10 (still within/electrically connected to their mounting/docking stations) can begin streaming live video, audio and/or images from their locations in the building/emergency location to the first responders/emergency personally either through wired or wireless communication technology.

Using their own personal electronic device (i.e. smartphone, tablet, laptop, etc.), the responders can observe multiple camera (still images or video)/audio fees from notifier 10 and/or the other notifiers 10. The responder using his or her electronic device can also preferably send or otherwise transmit audio to the notifier 10 or other notifiers 10.

Preferably, once notified of the emergency/event, the occupants can follow emergency/event protocol and move to designated locations. As they travel to these locations, the occupants can remove notifiers 10 from nearby stations. The occupants can use their notifiers 10 to send/transmit date and to communication with the first responders. Preferably, though not limiting functionality, can include: live video, still images, push to talk/hear, push for flashlight, stealth mode, location determinations/identifications, presence of life and/or temperature/moisture.

Preferably, using the information from the notifier(s) 10 in the possession of the occupants and the notifier(s) 10 still secured to their corresponding docket station 400, the first responders or other involved individuals, can form an appropriate response plan. Notifiers 10 allow the first responders to identify the location of the devices in the building or area of the emergency/event (and/or occupants for notifiers 10 removed from their docking station 400) and using the camera feed(s) from the notifier(s) 10 can detect hostiles and obstructions. Implementing the response plan preferably based on or aided by the information from the notifier(s) 10, the first responders reach the location of the emergency/event and rescue the occupants.

Figure 10:
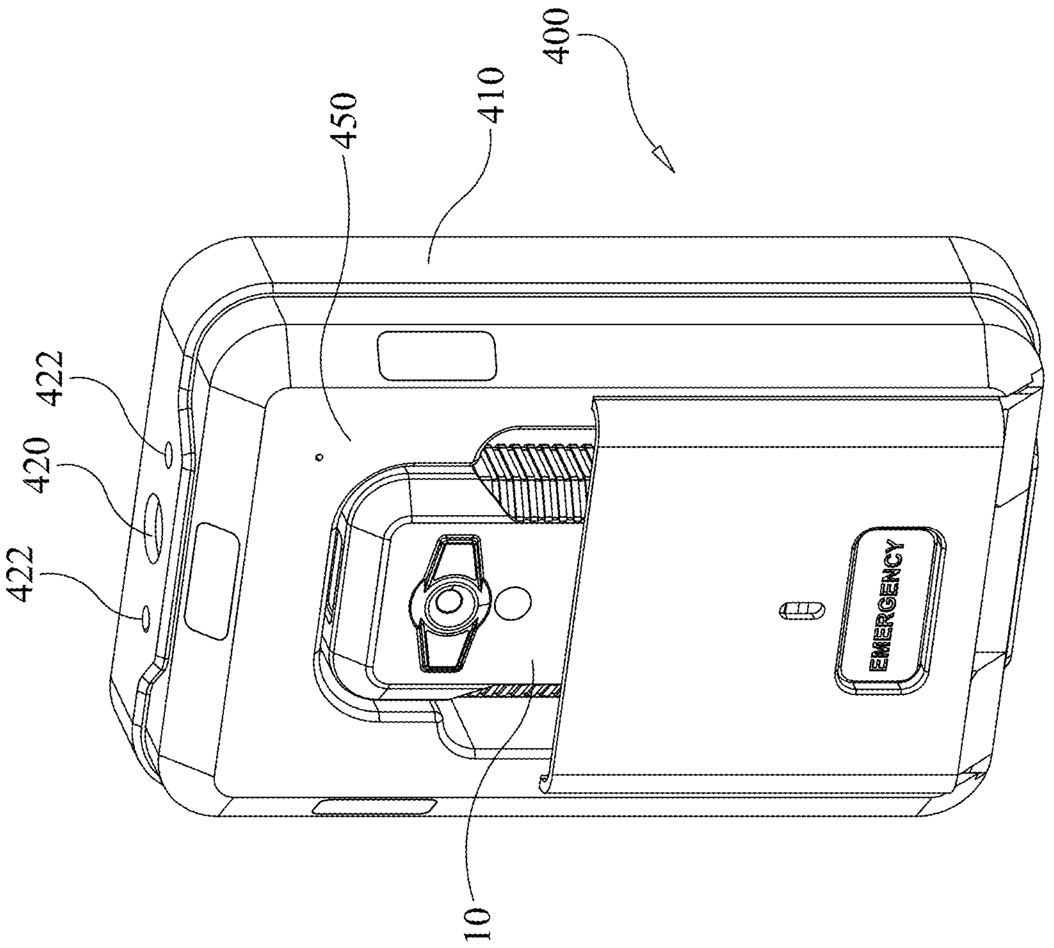
FIG. 10 illustrates a non-limiting embodiment for the docking station with a non-limiting IVAN embodiment secured thereto prior to removal in accordance with the present disclosure.
Figure 12:
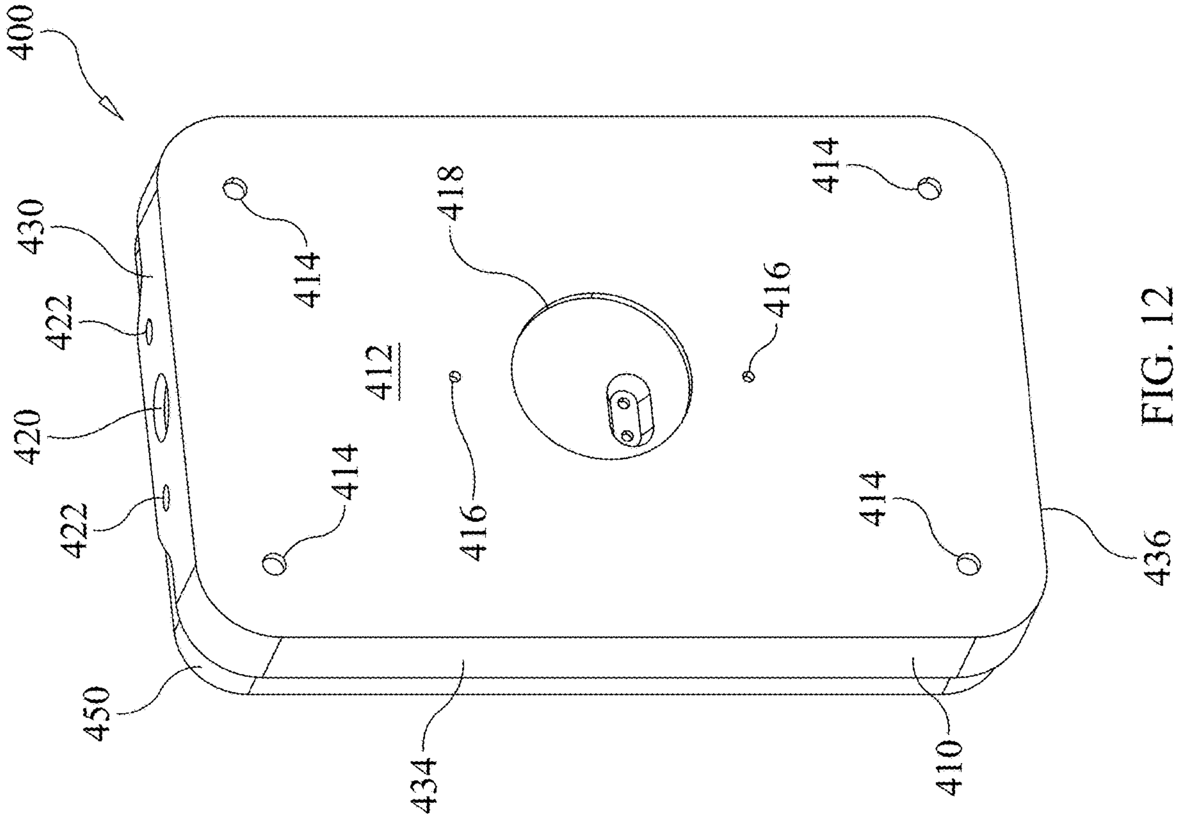
FIG. 12 illustrates a back perspective view of the docking station of FIG. 10.
Figure 11:
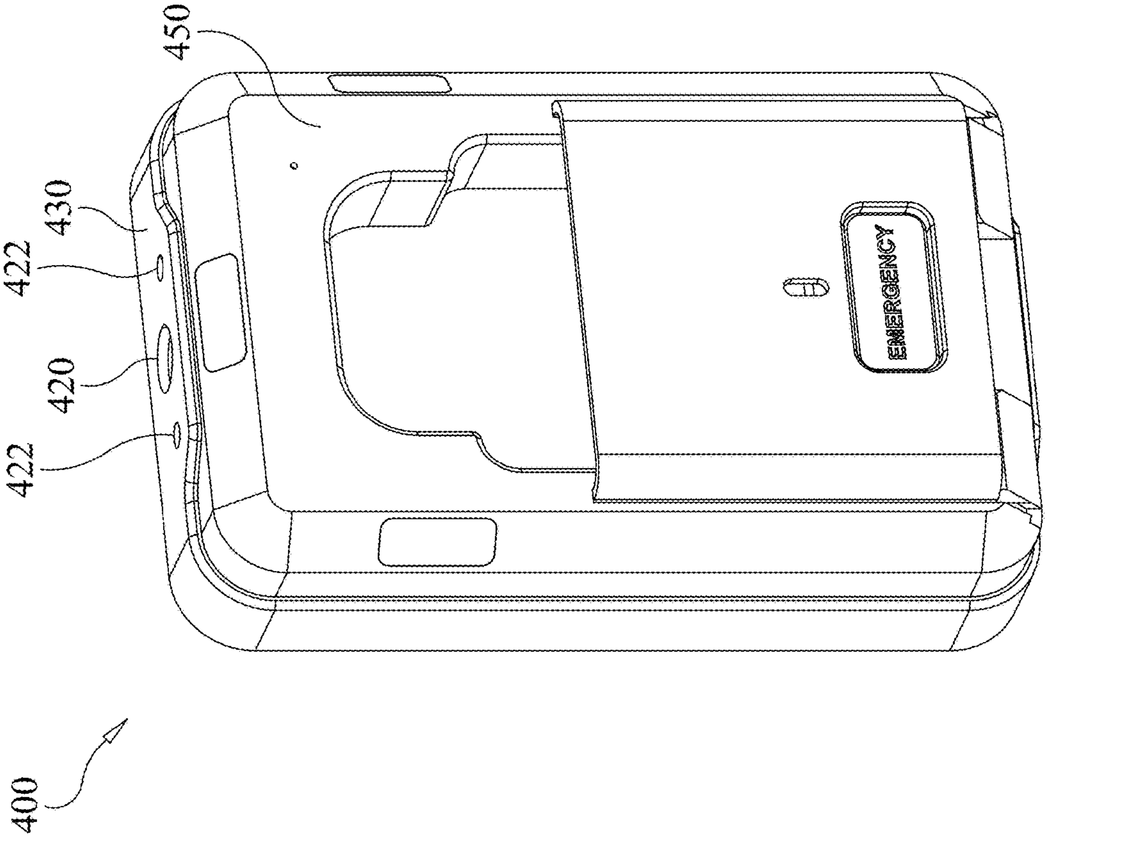
FIG. 11 illustrates a front perspective view of the docking station of FIG. 10 with the IVAN removed.
Figure 14:
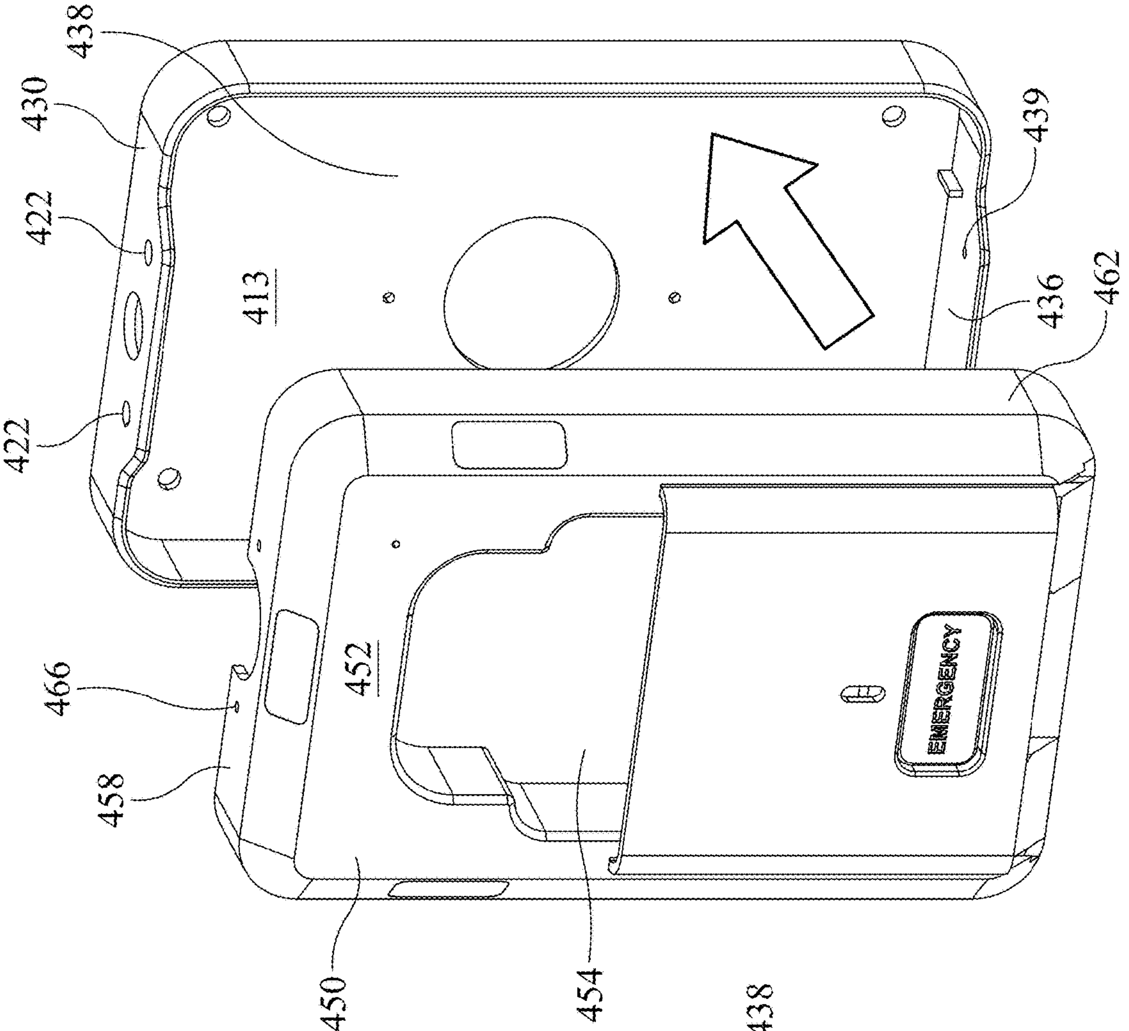
FIG. 14 is an exploded view of the docking station of FIG. 10.
Figure 13:
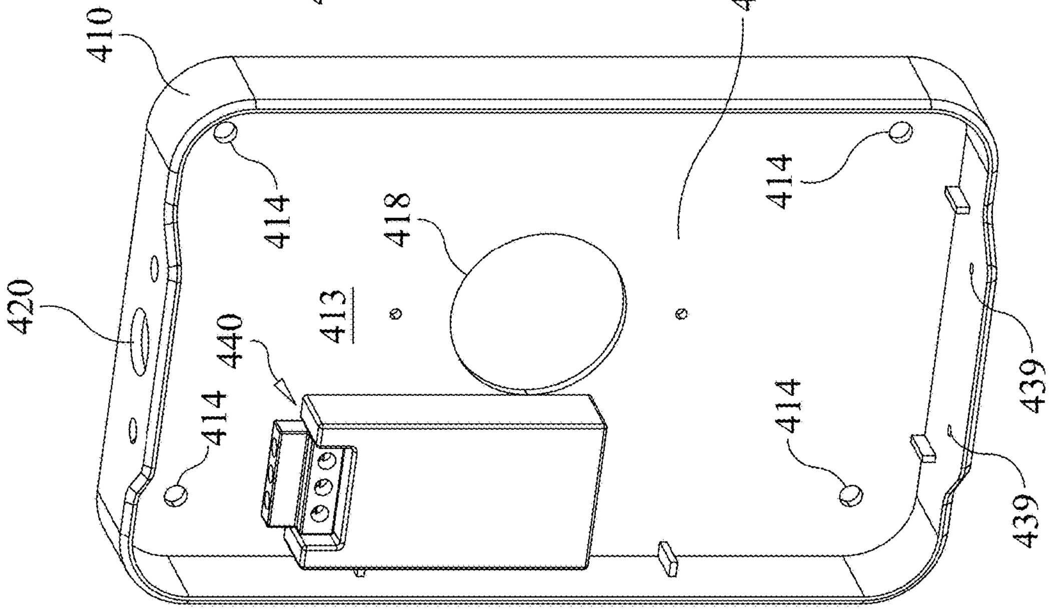
FIG. 13 illustrates a back member of the docking station of FIG. 10.
Figure 16A:
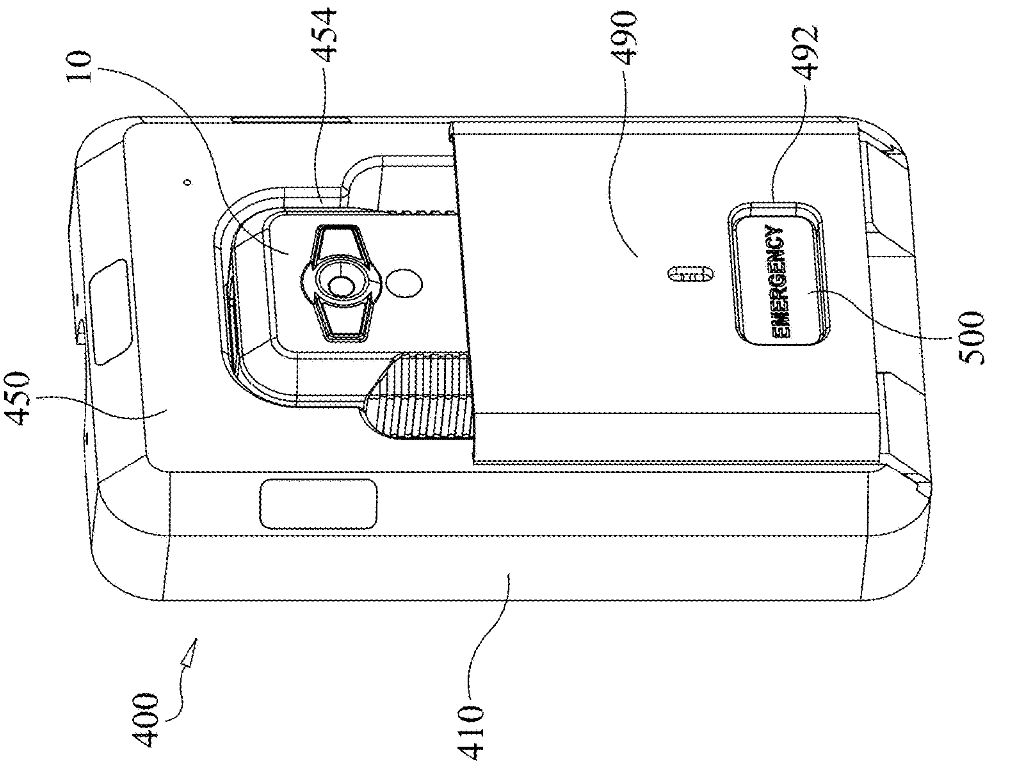
FIGS. 16A, 16B, 16C, 16D and 16E illustrates the steps involved for removing the IVAN from the docking station embodiment of FIG. 10 in accordance with the present disclosure.

FIG. 10 illustrates a non-limiting embodiment for notifier 10 being stored, housed or otherwise connected or secured to its associated docking station 400 when not in use (i.e. prior to an emergency situation occurring, etc.).

FIGS. 11-15 illustrate preferred, though non-limiting, details for docking station 400 and show in the preferred embodiment that docking station 400 can include a back member 410 having back surface 412 with a plurality of mounting/securing apertures/holes 414 and apertures/holes 416 for securing to an outlet box, as well as a larger aperture/418, preferably centrally located, though such location is not considered limiting. A top opening/conduit 420, along with additional fastener holes 422 can be provided in a top wall 430 of back member 410. Back member 410 can also be preferably provided with a left side wall 432, right side wall 434 and bottom wall 436 which can define a receiving area 438 for receiving a portion of the front member 450 of docking station 400 which will be discussed in more detail below. Bottom wall 436 can also be provided with fastener holes 439 similar to fastener holes 422 of top wall 430.

Preferably, when installing back member 410 to a wall or other surface, outlet box holes or the corner mounting holes 414 can be used as conventional connection (i.e. mounting screws, bolts, other fasteners, etc.). Any necessary wires, such as any power or electrical wires from an electrical box area or another location, can be routed or directed through aperture 418 and/or opening/hole/conduit 420 and can be connected to an AC/DC converter 440 preferably secured to a front surface 413 of back member 410. Alternatively, or in addition thereto, the above noted POE and/or 12V charging options can also be incorporated.

Front member 450 can be provided with a front surface 452 having a cavity 454, a back surface 456 and a top wall 458, left side wall 460, right side wall 462 and bottom wall 464. Top wall 458 and bottom wall 464 can be provided with fastener holes 466 and 468, respectively, which can be aligned with fastener holes 422 and 438, respectively, when front member 450 is properly positioned within receiving area 438 to allow for conventional connection of front member 450 to back member 410 (i.e. mounting screws, bolts, other fasteners, etc.). When securing front member 450 to back member 410 any wires associated with front member 450 can also connected to AC/DC converter 440. In one non-limiting embodiment, front member 450 can be slid onto back member 410 and properly positioned/aligned, preferably two screws on the top and two screws on the bottom, in association with the fastener holes discussed above, which can be used to maintain front member 450 on back member 410.

Figure 15:
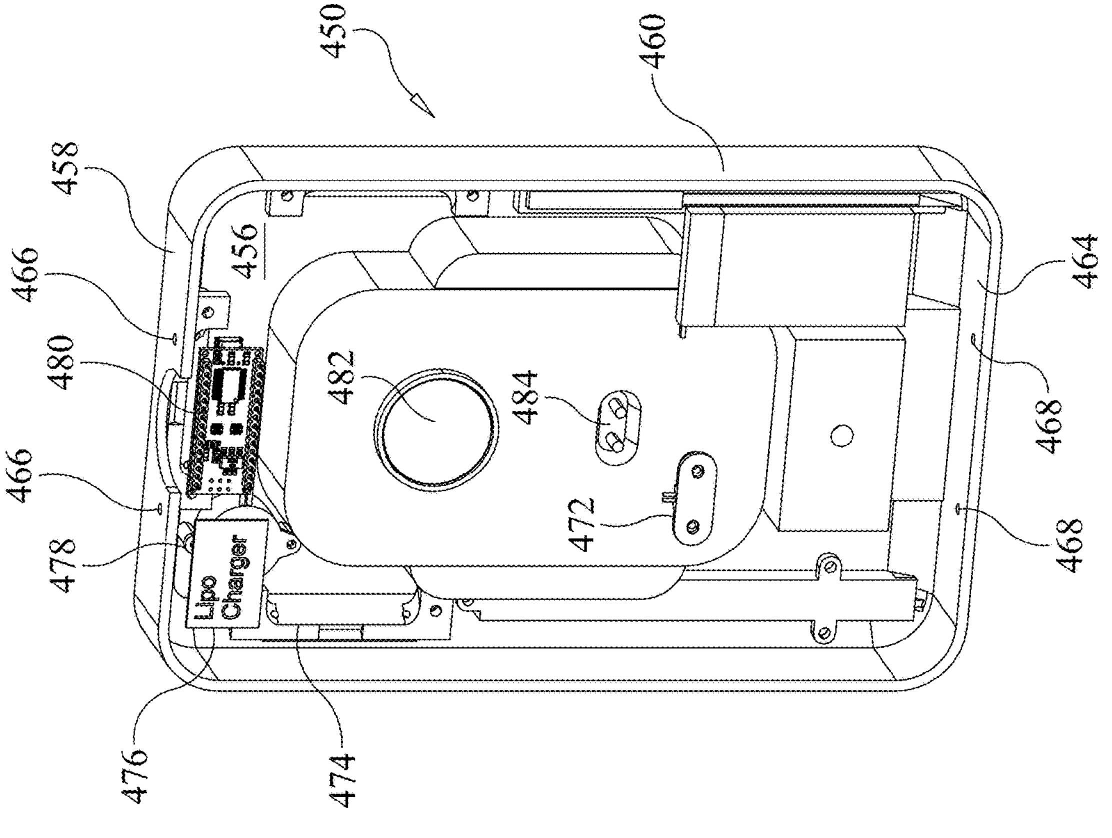
FIG. 15 is a perspective view of the back side of the front member of the docking station of FIG. 10.
Figure 16D:
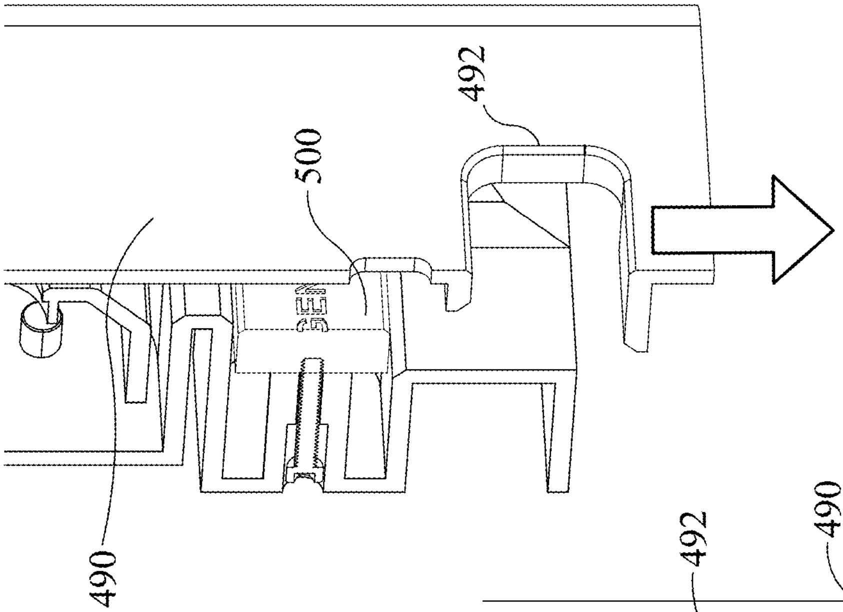
Figure 16C:
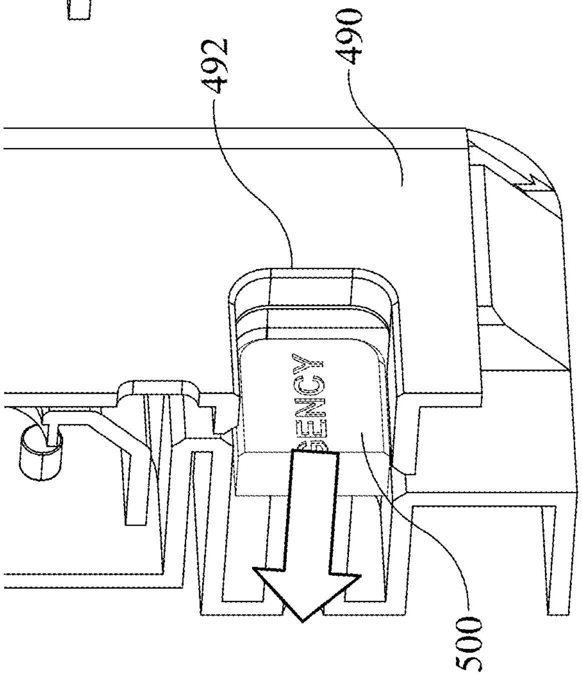
Figure 16B:
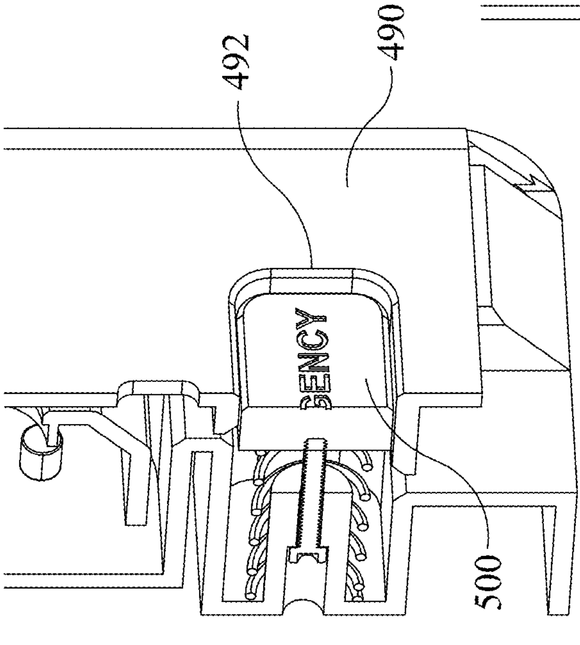

As been seen in FIG. 15, secured to back surface 456 or some other preferably internal location of front member 450 can include the following electrical and mechanical components, whose purpose or function are conventional: Hall effect sensor 472, a plurality of LED Boards 474 (×3), power management component 476, piezo speaker 478, processing PCB (printed circuit board) 480, securing magnet 482, device charging contacts 484 which preferably extend through and are accessible on the other side so as to make contact with notifier 10 when notifier 10 is inserted within cavity 454 (i.e. prior to an emergency situation) as a preferred mechanism for charging notifier 10, and backup battery 486.

FIGS. 16*a*-16*e* illustrate one embodiment for how a user accesses notifier 10 during an emergency situation or when another scenario requiring use of notifier 10 occurs. As seen in FIG. 16, notifier 10 resides within cavity 454 and is partially hidden behind slide cover 490 whose inwardly turned side/ends are preferably residing within corresponding tracks 496 on front surface 452. Slide cover 490 includes aperture 492 which a movable button 500 rested within (i.e. preferably by positioning of a spring member 502). Button 500 resting within aperture 492 (i.e. button engaged) prevents slide cover 490 from being slid downward. When notifier 10 is needed, a user pushes button 500 inward which causes it to be no longer resting within aperture 492 and thus allowing the user to slide/move/pull cover 490 downward which permits notifier 10 to be removed from within cavity 454 for use by the user during the emergency or other situation.

Figure 16E:
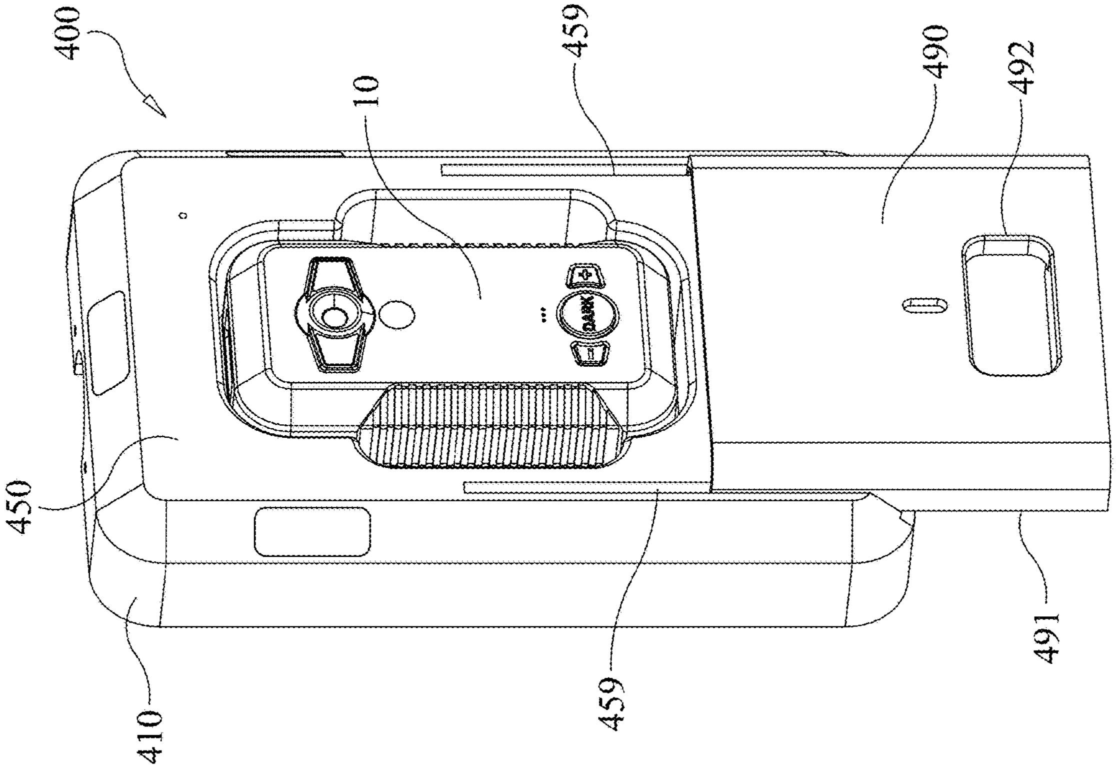

As best seen in FIG. 16*e*, in one non-limiting embodiment, at least portions of side walls 491 of slide cover 490 can received within guide slots 459 disposed on front surface 452 for guiding the travel (up/down) of slide cover 490. Preferably, slots 459 having a closed first end and an open second end, such that slide cover 490 can preferably only be slid in one direction when releasing/accessing notifier 10 from within cavity 454 of mounting/docking station 400.

Figure 17:
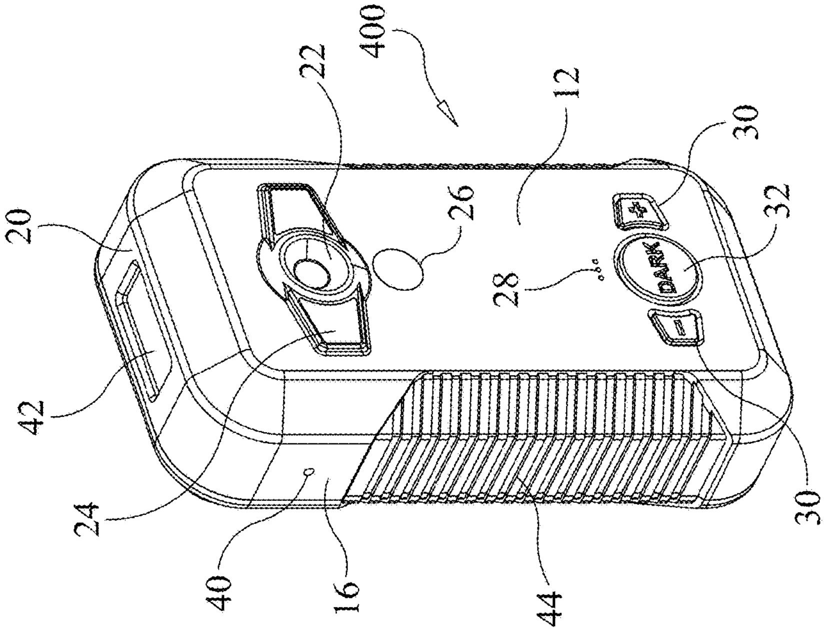
FIG. 17 illustrates a front perspective view of a non-limiting embodiment for the IVAN in accordance with the present disclosure.
Figure 18:
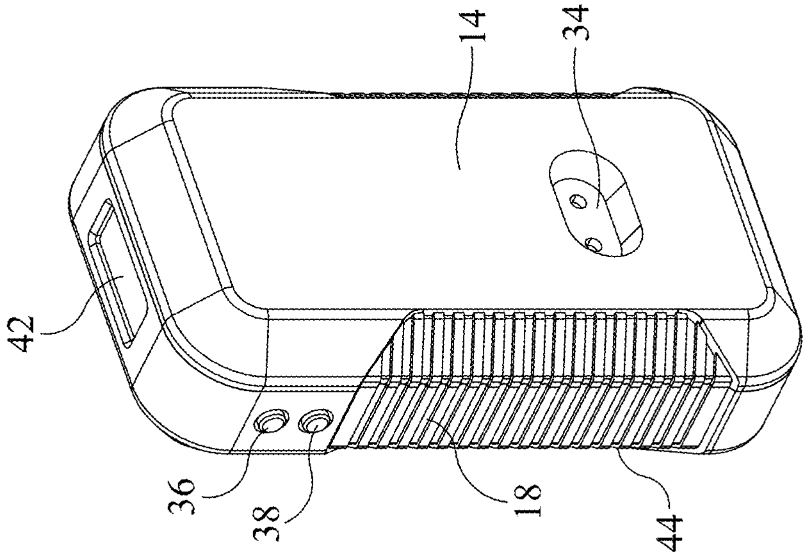
FIG. 18 illustrates a back perspective view of a non-limiting embodiment for the IVAN of FIG. 17.

FIG. 17 illustrate one non-limiting embodiment for notifier 10, which has a front area 12, back area 14, left side 16, right side 18 and top portion 20. Though not considered limiting, front area 12 can be provided with a camera lens 22, IR LEDs 24, flashlight LED 26, speaker 28, volume controls 30 and stealth mode mode/activator 32. Though not considered limiting, as seen in FIG. 18 charging contacts 34 can be provided at back area 14 for mating within charging contacts 484 of front member 450 when notifier 10 is disposed within cavity 454 for charging notifier 10. With the charging capabilities through the contacts 34 and 484 and the charging power source, notifier 10 is preferably fully charged when it is accessed by the user as described above. Also seen in FIG. 18 is a "push to talk" button/switches 36 and flashlight button/activator/switches 38 shown on right side area 18, though such location is not considered limiting. Also seen in FIG. 17, a microphone 40 can be provided on left side area 16, though such location is not considered limiting. Though again not limiting, preferably top portion 20 is provided within a digital display 42. An outer area of notifier can be provided with a gripping member 44 for easier holding of notifier 10.

Figure 20:
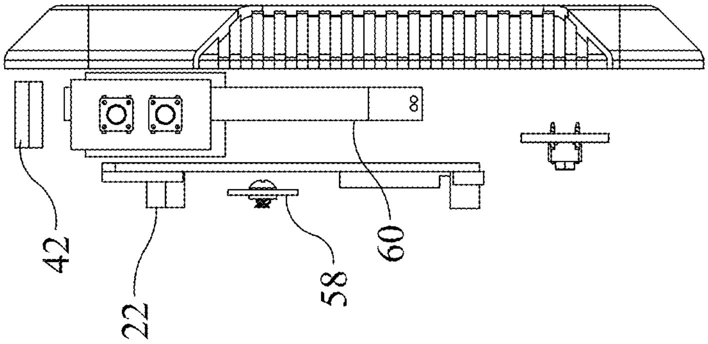
FIG. 20 illustrates a side view of the interior embodiment of FIG. 19.
Figure 19:
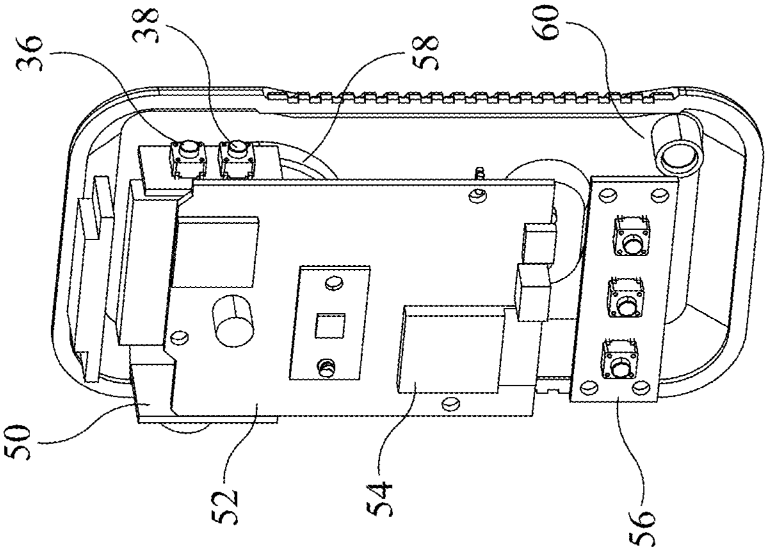
FIG. 19 illustrates a front perspective view of the interior for the IVAN of FIG. 17 showing certain non-limiting electronic components that can be provided for IVAN.

FIGS. 19 and 20 show the preferred components disposed within notifier 10. Some of the preferred components for notifier 10 include microphone PCBA 50, Arducam PCBA 52, Wifi module 54, volume and stealth mode PCBA 56, push to talk and flashlight switches 36 and 38, respectively, a magnet 58 for securing notifier 10, a magnet 60 used for dock detection, digital display 42, camera lens 22, Flashlight PCBA 58, and battery 60.

The internal and external accessible components of notifier 10 perform their ordinary conventional functions.

Preferably the camera associated with camera lens 22 can be provided on its own printed circuit board ("PCB") and can be held in place within notifier 10 by an internal bracket (preferably constructed from plastic, though not considered limiting) and fasteners. In a preferred embodiment, the camera can be connected (electrically connected) to the main PCBA (PCB 52) using a ribbon cable. Microphone 40 can be preferably at least partially covered by a gasket (preferably constructed from rubber, though not considered limiting), with the gasket being used to isolate exterior sounds from "noise" or "echos" from within notifier 10.

In one embodiment, battery 60 disposed within notifier 10 can be a 3.6V, 3120 mAh LiPo battery though such is not considered limiting and other types of batteries and/or batteries with different values can be used and are considered within the scope of the disclosure. Battery 60 can be held in place with adhesive backed foam and can sit or otherwise be positioned behind main PCBA 52 though such location is not considered limiting.

Speaker 28 can be covered by a water resistant acoustic membrane and in a preferred embodiment, the opening in the body of notifier 10 for speaker 28 (i.e. adjacent to the internal location of speaker 28 within notifier 10) can be barely visible from the outside. IR LEDs 24 can be preferably provided with their own PCB in order to optimize positioning within notifier 10. The IR LED PCB can include two contact pads which can connect to springs provided on main PCB 52 to transfer power.

Figure 22:
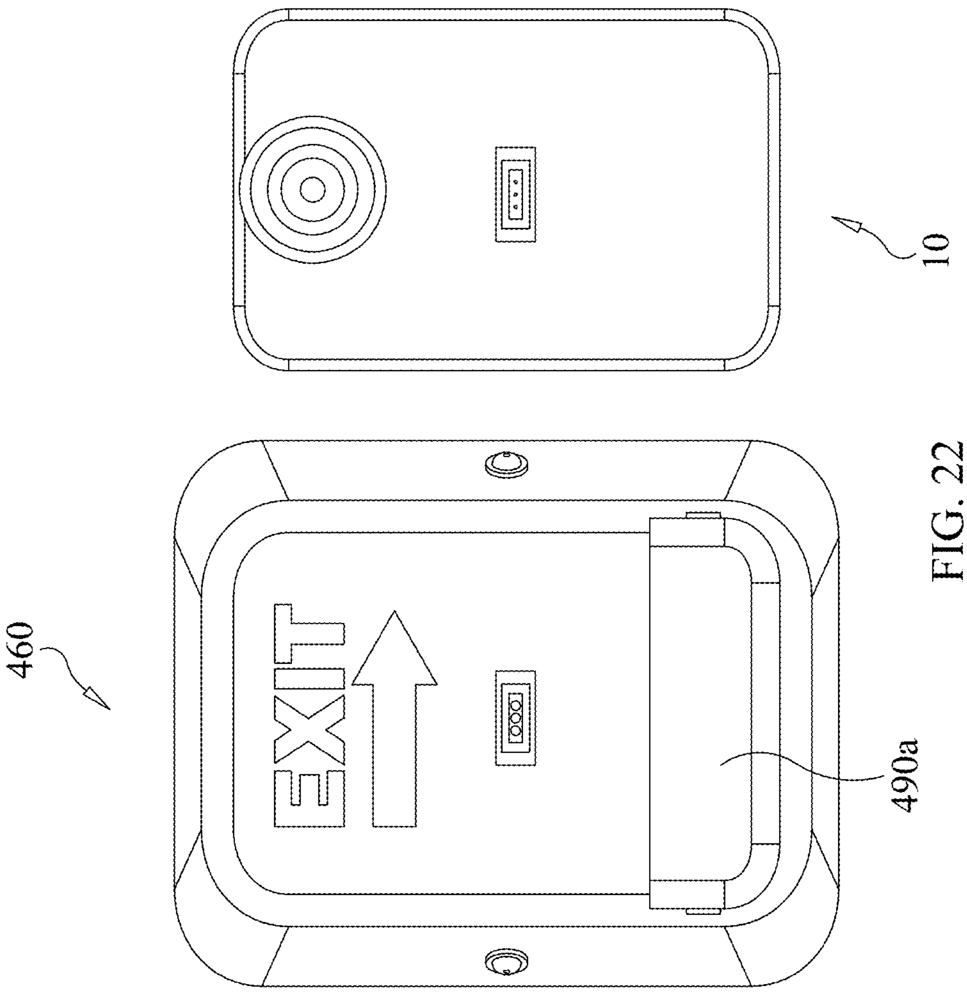
FIG. 22 illustrates the docking station of FIG. 21 with the IVAN removed.
Figure 21:
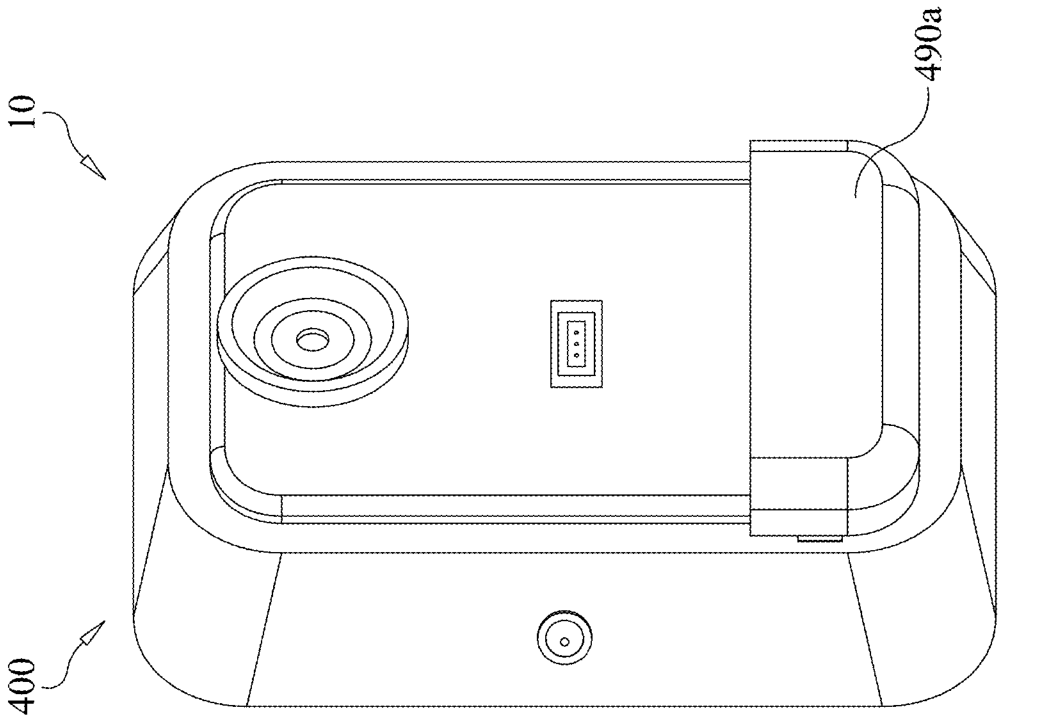
FIG. 21 illustrates another non-limiting embodiment for the docking station with a non-limiting IVAN embodiment secured thereto prior to removal in accordance with the present disclosure.

FIG. 21 illustrates another non-limiting embodiment for notifier 10 and docking station 400. As opposed to sliding down cover 490, cover 490*a* is pulled out when accessing notifier 10. As seen in FIG. 22, when notifier 10 is removed, a front surface 452*a* of docking station 400 can also reveal directions to the person and any other nearby occupant to an Exit for the building. In all embodiments, docking station 400 can act as a docking location for notifier 10 and can also acts as an alarm for the occupants, while also preferably serving as a beacon for location monitoring during an emergency or other monitored event. Certain non-limiting features for notifier 10 and/or docking station 400 can include one or more of the following: notifier 10 charging, battery back up (especially in case of power failure at the building), location monitoring of notifier(s) 10 via Proximity, LED alarms (such as, but not limited to, CODE RED alarms), audible alarms, notifier 10 removal detection, live video, push to talk audio, etc.

In all embodiments notifier 10 can record and stream still images, video and/or audio to first responders and other individuals involved with the emergency or event. Thus, notifier 10 can act as a connection (i.e. wireless electronic connection) between occupants and responders/other individuals to help create and execute an effective rescue or disaster handling plan. Certain non-limiting features/functionality for notifier 10 can include one or more of the following:

a. Live Video—records and transmits video/still images of events preferably as they are happening to inform first responders. Preferably provided infrared LEDs allow for use of notifier 10 when the area or room is dark.
b. Flashlight—can be used to illuminate dark rooms or locations, sends signals and/or blind hostiles.
c. Audio Monitoring—allows first responders and others to listen in on an “active” situation as it is happening. The user of notifier 10 can also communicate with first responders and others via preferably provided “Push to Talk” technology. The notifier can be provided with Push to Talk/Hear technology.
d. Stealth Mode—allows the user to make notifier 10 go dark with notifier 10 programmed to silence itself to help protect the user from being noticed by a hostile.
e. Location Monitoring—notifier 10 can be preferably provided with an installed beacon(s) to track the location of notifier 10 which notifier 10 can transmit to first responders to help them get to the user and/or other occupants faster.
f. Sign of Life Monitoring—notifier 10 can be programmed and provided with technology to allow it to monitor for “signs of life” to improve the effectiveness of rescue missions.
g. Other monitoring technology such as for temperature/moisture readings/measurements.
h. Preferably, some or all other notifiers 10 still positioned within their corresponding mounting/docking stations 400 in the building, emergency location, etc. can be activated by the removal of one notifier 10 from its mounting/docking station 400 and the other notifiers can stream live video, audio and/or images from their respective locations to the first responders and emergency personnel to provide such individuals with additional current information regarding the emergency.

Figure 23:
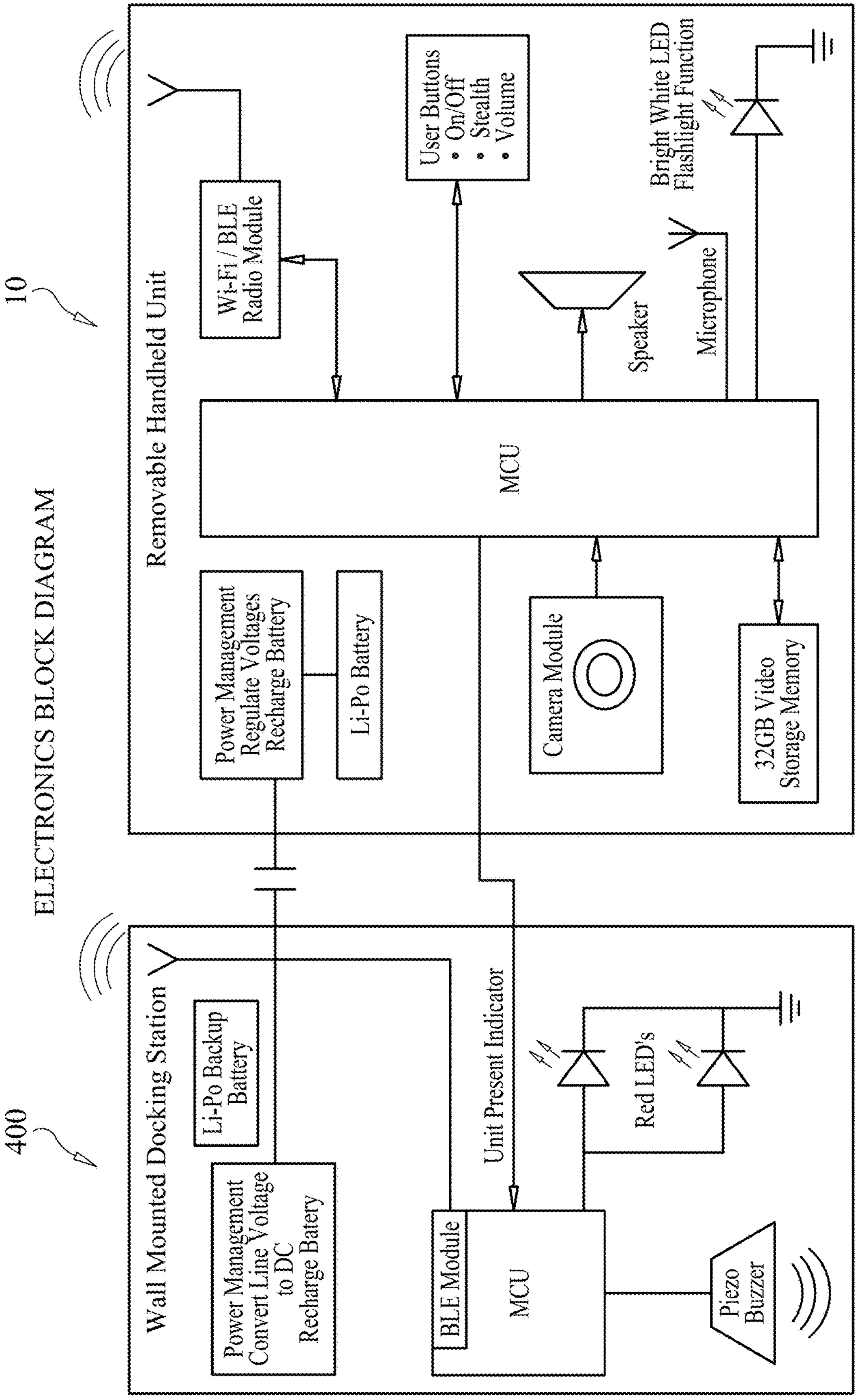
FIG. 23 illustrates a non-limiting electronic block diagram for one embodiment for the docking station and IVAN.

FIG. 23 illustrates one non-limiting embodiment for an electronics block diagram of both docking station 400 (i.e. wall or surface mounted docking station, etc.) and notifier 10 (i.e. removable handheld unit). The various components operate in the conventional manner and communication between the notifier 10 and docking station can occur through one or more conventional communication technologies now known or later developed.

Cameras (i.e. for video and/or still images) can be preferably provided at the front and at back of notifier 10. The camera can have ordinary components such as a lens, lens base, CMOS sensor, PCB, and can provided images and video in one or more resolutions, frames per second, as well as provided for IR filtering such as with the use of a motorized IR cut filter.

Notifier 10 can also be provided with storage memory for storing video, still images, audio and/or other information.

Figure 24:
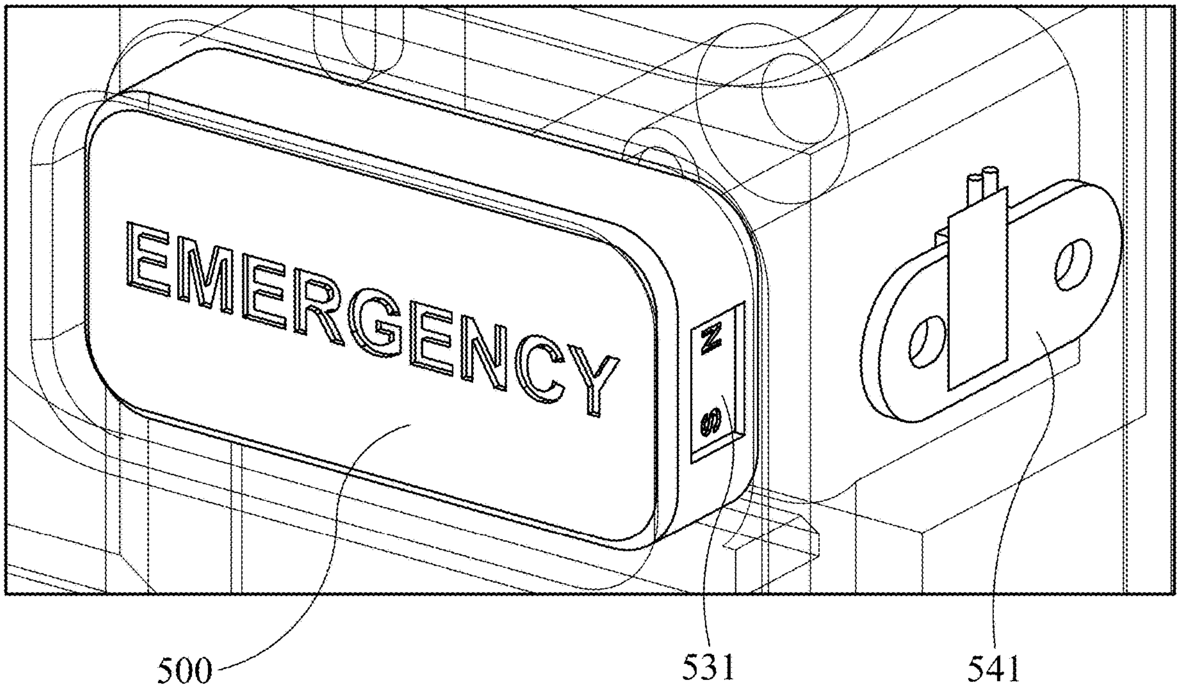
FIG. 24 is a close-up partial perspective view shown a first embodiment for triggering events with the system in accordance with the present disclosure prior to pressing the EMERGENCY button.
Figure 25:
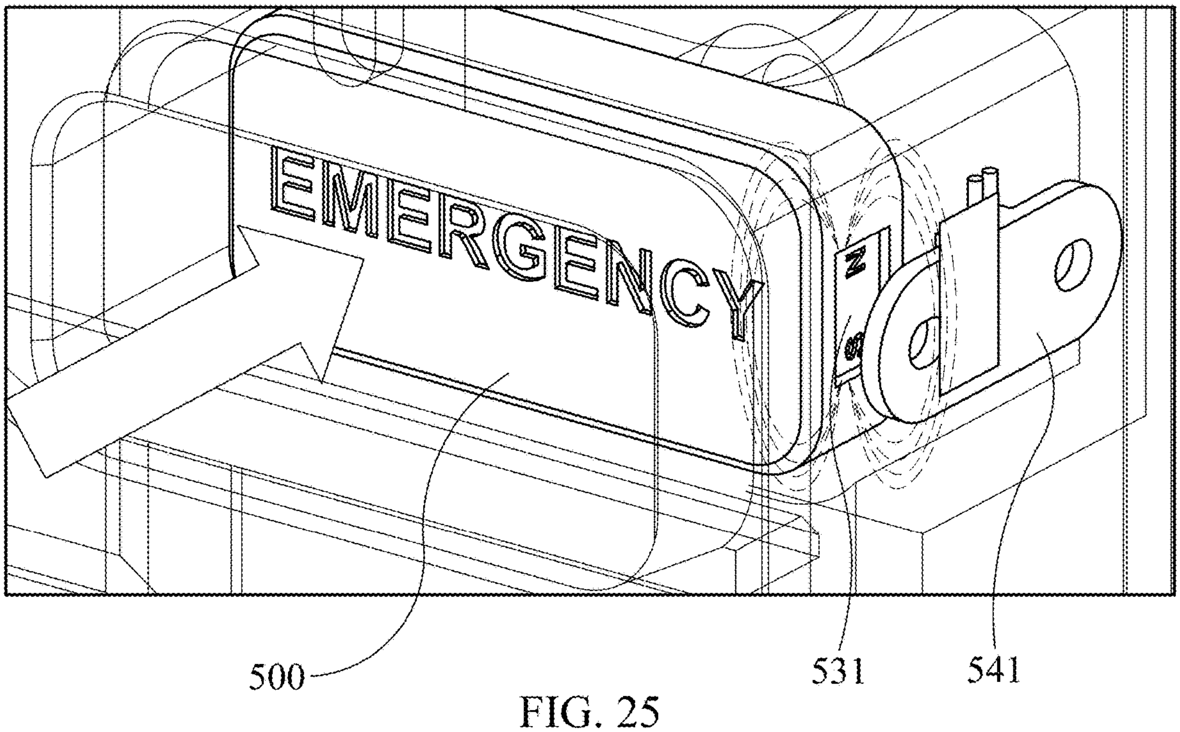
FIG. 25 is a close-up partial perspective view of the triggering event first embodiment after the EMERGENCY button has been pressed/activated in accordance with the present disclosure.
Figure 26:
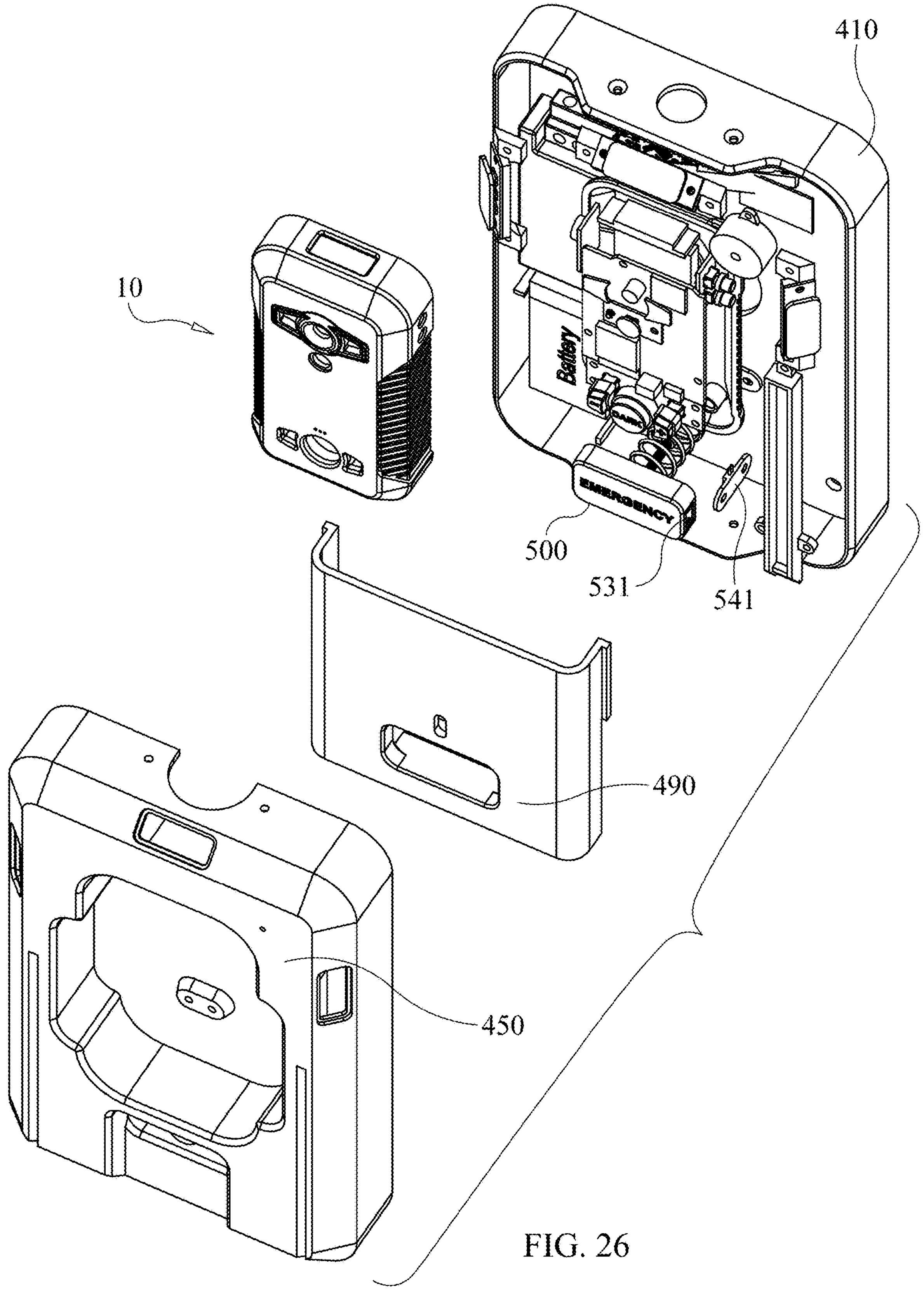
FIG. 26 is a perspective exploded view for one embodiment of the notifier and docking station in accordance with the present disclosure.

FIGS. 24, 25 and 26 illustrate one non-limiting embodiment, for triggering one or more initial activation events. These events can include, without limitation, taking a picture of the user as he or she removes notifier 10, sending/transmitting a wired or wireless signal/alert to one or more emergency personnel, causing the other notifiers 10 in the building to stream and transmit live video, audio and images from their locations to the one or more emergency personnel, etc. In this embodiment, the pushing of button 500 by the user, to allow the user to slide cover 490 downward is the user’s action that triggers the one or more initial events to begin. Preferably a magnet 531 is located on a side portion of button 500, with the magnet creating or producing a magnetic field. A Hall effect sensor 541 is located within the housing of front member 450 of the docking/mounting station 400 and when button 500 is pushed inward by the user, the magnetic field created by magnet 531 passes over (or otherwise sensed by sensor 541) and triggers Hall effect sensor 541 to send a signal to one or more of the microcontrollers/microprocessors/circuity to cause the one or more initial activation events to begin/occur. Other sensors or mechanisms can also be used to determine that button 500 has been pushed inward and to trigger the activation events. Also, a tactile switch and/or spring loaded contacts assembly could also be used and considered within the scope of the disclosure. The use of magnet 531 and Hall effect sensor 541 is preferred, as it doesn’t require the pressing of button 500 to be perfect by the user (especially in an emergency situation). The nature of the magnetic field merely requires it to be close to Hall effect sensor 541 for Hall effect sensor begin the above-noted actions.

In addition to triggering one or more alerts when button 500 is pressed, as an alternative embodiment, triggering can occur when notifier 10 is removed from docking station, and such alternative triggering configuration is also considered within the scope of the disclosure. In this embodiment, the Hall-effect sensor can be provided on the docking station and the magnet on notifier 10.

In one non-limiting embodiment, notifier 10 can be designed/programmed for constant recording of video, audio and/or images preferably into a circular buffer that allows for the review of the video, audio and/or images that were captured by notifier 10 just prior to notifier 10 being activated (i.e. removed from mounting/docking station 400). Though not considered limiting, notifier 10 can be programmed to retain the prior 60 seconds of video from the moment in time that notifier 10 is activated. However, other larger and smaller amounts of time (greater or less than 60 seconds) of video to retain can also be used/programmed and are also considered within the scope of the disclosure. The circular buffer preferably allows the older video to be constantly written over and updated with newly captured video.

It also within the scope of the disclosure to be able to control one or more notifiers through the use of a key-fob or similar device (i.e. such as the situation where the user cannot get to notifier 10/docking station 400). Furthermore, an App may also be downloaded to a user's phone that can be also associated with one or more notifiers 10 to again allow the user to control at least one notifier 10 through use of the App, without the user actually removing notifier 10 from its securement to docking station 400. In one embodiment, the App can also notify a cloud-based system associated with the notifiers and the cloud-based system can communicate with one or more, or all of the notifiers 10 locating in the building or other location of the emergency. In this embodiment, the signal to the notifiers can come from cell or Wifi network to activate the notifiers.

Emergency button 500 can be designed to prevent a person who has removed notifier 10 from docking station 400 from easily reinstalling notifier 10 to docking station 400, without the use of a specific tool, which may act as a deterrent for a person tampering with notifier 10 and/or docking station 400. In one non-limiting embodiment, the specific tool is required in order to reset the removed notifier when it is put back into docking station 400. As a non-limiting example, when pushing in button 500, a "catch" of button 500 (i.e. oval shaped slot, etc.) can occur and the insertion of the specific/special tool is required to release button 500 from its "catched" position.

Though not considered limiting, in one or more embodiments for the system 433 MHz RF transmitter and/or receiver modules can be used or incorporated for some or all of the wireless capabilities. The electrical/mechanical connections, coding, programming and/or powering for the transmitter and/or receiver modules would preferably be as conventionally known for such transmitters and receiver modules and such conventional connections, coding, programming and powering are considered incorporated by reference into this disclosure.

Some of the preferred, though non-limiting features of the disclosed instant alert notifier, include, without limitation:

1. Assembly hard-wired into single-gang electrical box
2. Video Resolution: preferably up to 4K, though not limiting
3. Memory: preferably 32 GB, though not limiting
4. Preferably up to 10 hours of continuous non-stop recording, though not limiting
5. Two 140-degree wide-angle lenses,
6. One-touch recording
7. Stealth mode
8. Built-in 820.11 WiFi; optional Z WAVE-enabled design
9. Built-in Geotag stamps date, time and GPS coordinates onto every video and/or photo file
10. Battery indicator
11. Built-in speaker
12. Vibration confirmation and low back-up battery alert
13. Simultaneous photo taking during video recording
14. Built-in night vision
15. Password protected
16. 60-second pre- and post-record, though not limiting
17. Built-in LED flashlight Though above characteristics are provided by way of example only and are not considered limiting and other characteristics, features, ratings, dimensions, values, uses, etc. can be used and are also considered within the scope of the disclosure.

It should be understood that the exemplary embodiments described herein should be considered in a descriptive sense only and not for purposes of limitation. Where multiple embodiments are disclosed, descriptions of features or aspects within each embodiment should typically be considered as available for other similar features or aspects in other embodiments. While one or more embodiments have been described with reference to the figures, it is understood that various changes in form and details may be made therein without departing from their spirit and scope and such changes are considered within the scope of the disclosure.

All parts/components of the instant alert notifier and docking station and their locations, wiring, powering means, charging means, recording means, storage means, broadcasting means, mechanical and/or electrical communications between parts/components and/or devices, attachment, docking or securement mechanisms, dimensions, values, ratings, shapes, colors, materials, etc. discussed above or shown in the figures or exhibits, if any, are merely by way of example and are not considered limiting and other component(s) and their locations, wiring, powering means, charging means, recording means, storage means, broadcasting means, mechanical and/or electrical communications between parts/components and/or devices, attachment, docking or securement mechanisms, dimensions, values, ratings, shapes, colors materials, etc. can be chosen and used and all are considered within the scope of the disclosure.

The benefits, advantages, solutions to problems, and any element(s) that may cause any benefit, advantage, or solution to occur or become more pronounced are not to be construed as a critical, required, or essential features or elements of any or all the future claims.

While the instant alert notifier and docking station has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A system for electronically notifying one or more responders or emergency personnel of an emergency event at a building, the building having one or more rooms with each room having one or more walls, comprising:

a first docking station secured to a surface within a room of the building, the first docking station having a front surface and a cover member secured to the front surface of the first docking station, the first docking station electrically connected to an existing electrical system of the building; and a first portable notifying device secured to the first docking station and electrically connected to the first docking station prior to use by a user located at the building during the emergency event, the cover member at least partially covering the first portable notifying device when the first portable notifying device is secured to the first docking station, the first portable notifying device having a first camera and microphone for capturing or streaming video, audio or images and a battery disposed within a housing or body member of the first portable notifying device;

wherein the battery of the first portable notifying device is charged by the first docking station when the first portable notifying device is secured and electrically connected to the first docking station; and wherein the first portable notifying device is programmed to automatically stream or transmit live video, audio or images from its location within the building to one or more remotely located electronic devices associated with the one or more responders or emergency personnel upon removal or release of the first portable notifying device from the first docking station.

2. The system for electrically notifying of claim 1 further comprising:

one or more additional docking stations secured at other areas within the building; and one or more additional portable notifying devices, each additional portable notifying device of the one or more additional portable notifying devices associated with a corresponding one of the one or more additional docking stations and secured and electronically connected to the corresponding docking station.

3. The system for electrically notifying of claim 1 wherein the cover member is movable with respect to the first docking station.

4. A method for virtual instantaneous notification of one or more remotely located persons of an active emergency event, comprising:

a. providing a first docking station and a first portable notifying device in a room of a building where the active emergency event is presently occurring, b. securing the first portable notifying device to the first docking station;

c. removing or releasing the first portable notifying device from its securement to the first docking station by an individual located within the room of the building; and d. upon removal or release of the first portable notifying device from the first docking station, wirelessly transmitting or streaming live video, audio or images, from the active emergency event by the first portable notifying device to one or more remotely located electronic devices of the one or more remotely located persons to provide the one or more remotely located persons with current information concerning the active emergency event.

5. The method for virtual instantaneous notification of claim 4 wherein the first docking station having a cavity and a cover member, wherein step b. comprises disposing the first portable notifying device disposed within the cavity and at least partially covering the first portable notifying device disposed within the cavity by the cover member.

6. The method for virtual instantaneous notification of claim 5 wherein step c. comprises moving the cover member such that it no longer at least partially covers the first portable notifying device and taking the first portable notifying device out of the cavity by the individual.

7. The method for virtual instantaneous notification of claim 6 wherein the step of moving the cover member comprising either pulling the cover member off its securement to the first docking station or sliding the cover member with respect to the first docking station to a point where it no longer blocks the first portable notifying device from being taking out of the cavity by the individual.

8. The method for virtual instantaneous notification of claim 4 further comprising the step of capturing video, audio or images from within the room by the first portable notifying device while the first portable notifying device is secured to the first docking station.

9. The method for virtual instantaneous notification of claim 4 further comprising the step of automatically notifying the one or more remotely located persons of the active emergency event when the first portable notifying device is removed or released in step c.

10. The method for virtual instantaneous notification of claim 4 wherein the step of providing a first docking station comprises securing the first docking station to a wall area of the room and electrically connecting the docking station with an existing electrical system for the building.

11. The method for virtual instantaneous notification of claim 10 further comprising the step of electrically charging a battery disposed within the first portable notifying device by the first docking station when the first portable notifying device is secured to the first docking station.

* * * * *